(12) United States Patent
Kurihara

(10) Patent No.: US 10,596,459 B2
(45) Date of Patent: Mar. 24, 2020

(54) SYSTEMS, METHODS, AND/OR COMPUTER READABLE STORAGE MEDIUM HAVING PROGRAM, FOR LOCALIZED HAPTIC FEEDBACK BASED ON POSITION OF VIRTUAL OBJECT

(71) Applicant: Nintendo Co., Ltd., Kyoto (JP)

(72) Inventor: Tatsuya Kurihara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 16 days.

(21) Appl. No.: 15/987,344

(22) Filed: May 23, 2018

(65) Prior Publication Data

US 2018/0345132 A1 Dec. 6, 2018

(30) Foreign Application Priority Data

Jun. 5, 2017 (JP) .................. 2017-110647

(51) Int. Cl.
*A63F 13/285* (2014.01)
*G08B 6/00* (2006.01)
*A63F 13/25* (2014.01)
*A63F 13/533* (2014.01)
*A63F 13/5372* (2014.01)

(52) U.S. Cl.
CPC ............ *A63F 13/25* (2014.09); *A63F 13/285* (2014.09); *A63F 13/533* (2014.09); *A63F 13/5372* (2014.09)

(58) Field of Classification Search
CPC .. G06F 3/016; G06F 2203/013; A63F 13/285; A63F 13/54; A63F 13/577
See application file for complete search history.

(56) References Cited

U.S. PATENT DOCUMENTS

| 5,734,373 A | 3/1998 | Rosenberg et al. |
| 6,645,076 B1 | 11/2003 | Sugai |
| 6,752,716 B1 | 6/2004 | Nishimura et al. |
| 6,864,877 B2 | 3/2005 | Braun et al. |

(Continued)

FOREIGN PATENT DOCUMENTS

| EP | 2 810 699 | 12/2014 |
| GB | 2508137 | 5/2014 |

(Continued)

OTHER PUBLICATIONS

Notice of Reasons for Refusal dated Apr. 10, 2019, issued in Japanese Application No. 2017-109998 (4 pages).

(Continued)

*Primary Examiner* — Lawrence S Galka

(74) *Attorney, Agent, or Firm* — Nixon & Vanderhye PC

(57) ABSTRACT

Provided is an example system in which an operation device includes a vibrator configured to vibrate at a specified frequency. When the vibrator vibrates at a first frequency, an upper portion of the operation device vibrates strongly. When the vibrator vibrates at a second frequency, a lower portion of the operation device vibrates strongly. When a cursor is located at an upper portion in a list, the vibrator is vibrated at the first frequency, whereby the upper portion of the operation device is caused to vibrate strongly. When the cursor is located at a lower portion in the list, the vibrator is vibrated at the second frequency, whereby the lower portion of the operation device is caused to vibrate strongly.

27 Claims, 19 Drawing Sheets

(56) References Cited

U.S. PATENT DOCUMENTS

| | | |
|---|---|---|
| 7,070,507 B2 | 7/2006 | Nishiumi |
| 7,733,637 B1 | 6/2010 | Lam |
| 8,059,089 B2 | 11/2011 | Daniel |
| 8,972,617 B2 | 3/2015 | Hirschman |
| 9,118,750 B2 | 8/2015 | Vossoughi |
| 9,126,119 B2 | 9/2015 | Joynes |
| 9,529,447 B2 | 12/2016 | Hodges |
| 9,711,980 B2 | 7/2017 | Hodges |
| 9,753,537 B2 | 9/2017 | Obana |
| 9,808,713 B1 | 11/2017 | Townley |
| 9,833,702 B2 | 12/2017 | Obana et al. |
| 9,855,498 B2 | 1/2018 | Townley |
| 10,062,247 B2 | 8/2018 | Obana et al. |
| 10,135,412 B2 | 11/2018 | Obana et al. |
| 10,286,310 B2 | 5/2019 | Obana et al. |
| 10,335,676 B2 | 7/2019 | Gohara |
| 2002/0080112 A1 | 6/2002 | Braun et al. |
| 2002/0155890 A1 | 10/2002 | Ha |
| 2004/0023719 A1 | 2/2004 | Hussaini |
| 2006/0046843 A1 | 3/2006 | Nakajima |
| 2006/0290662 A1 | 12/2006 | Houston et al. |
| 2008/0155415 A1* | 6/2008 | Yoon .................. G06F 3/016 715/716 |
| 2009/0131171 A1 | 5/2009 | Miyazaki |
| 2010/0153845 A1* | 6/2010 | Gregorio ............. G06F 3/016 715/702 |
| 2010/0250815 A1 | 9/2010 | Street |
| 2010/0260996 A1 | 10/2010 | Chen |
| 2011/0053691 A1 | 3/2011 | Bryant |
| 2011/0134034 A1 | 6/2011 | Daniel |
| 2011/0260969 A1 | 10/2011 | Workman |
| 2011/0260996 A1 | 10/2011 | Henricson |
| 2012/0150431 A1 | 6/2012 | Ooka |
| 2012/0162113 A1* | 6/2012 | Lee ..................... G08B 6/00 345/173 |
| 2013/0095925 A1 | 4/2013 | Xu |
| 2013/0178285 A1 | 7/2013 | Joynes |
| 2013/0178290 A1 | 7/2013 | Joynes |
| 2013/0207792 A1 | 8/2013 | Lim et al. |
| 2013/0267322 A1 | 10/2013 | South |
| 2013/0281212 A1 | 10/2013 | Tsuchiya et al. |
| 2013/0318438 A1 | 11/2013 | Afshar |
| 2013/0342339 A1 | 12/2013 | Kiefer |
| 2014/0056461 A1 | 2/2014 | Afshar |
| 2014/0184508 A1 | 7/2014 | Tamasi |
| 2014/0205260 A1 | 7/2014 | Lacroix et al. |
| 2014/0206451 A1 | 7/2014 | Helmes |
| 2014/0210756 A1 | 7/2014 | Lee |
| 2014/0247246 A1 | 9/2014 | Maus |
| 2014/0248957 A1 | 9/2014 | Eck et al. |
| 2014/0274394 A1 | 9/2014 | Willis |
| 2014/0341386 A1 | 11/2014 | Cimaz |
| 2015/0084900 A1 | 3/2015 | Hodges |
| 2015/0160772 A1* | 6/2015 | Takeuchi ............. G06F 3/0414 345/177 |
| 2015/0205328 A1 | 7/2015 | Lin |
| 2015/0209668 A1* | 7/2015 | Obana .................. A63F 13/285 463/31 |
| 2015/0263685 A1 | 9/2015 | Obana et al. |
| 2015/0323996 A1 | 11/2015 | Obana |
| 2015/0355711 A1* | 12/2015 | Rihn .................. G06F 3/011 340/407.2 |
| 2015/0356838 A1 | 12/2015 | Obana et al. |
| 2015/0356868 A1 | 12/2015 | Cuende Alonso |
| 2016/0192067 A1 | 6/2016 | Obana et al. |
| 2016/0209968 A1 | 7/2016 | Taylor |
| 2016/0231773 A1 | 8/2016 | Inoue |
| 2017/0176202 A1 | 6/2017 | Anderson |
| 2017/0199569 A1 | 7/2017 | Cruz-Hernandez |
| 2017/0361222 A1* | 12/2017 | Tsuchiya ................. A63F 13/24 |
| 2018/0078422 A1* | 3/2018 | Dierenbach ........... A61F 11/045 |
| 2018/0181201 A1 | 6/2018 | Grant et al. |
| 2018/0203509 A1 | 7/2018 | Yamano et al. |
| 2018/0203510 A1* | 7/2018 | Yamano ................. A63F 13/211 |
| 2019/0039092 A1* | 2/2019 | Kim ........................ B06B 1/045 |

FOREIGN PATENT DOCUMENTS

| | | |
|---|---|---|
| JP | 2000-245964 | 9/2000 |
| JP | 2003-199974 | 7/2003 |
| JP | 2003-275464 | 9/2003 |
| JP | 2004-057654 | 2/2004 |
| JP | 2006-068210 | 3/2006 |
| JP | 2009-061161 | 3/2009 |
| JP | 2013-164845 | 8/2013 |
| JP | 2013-236909 | 11/2013 |
| JP | 2015-141647 | 8/2015 |
| JP | 2015-172899 | 10/2015 |
| JP | 2015-232786 | 12/2015 |
| JP | 2015-232880 | 12/2015 |
| JP | 2016-123513 | 7/2016 |
| JP | 2017/043400 | 3/2017 |
| WO | 2011/043292 | 4/2011 |
| WO | 2013/049248 | 4/2013 |

OTHER PUBLICATIONS

Notice of Reasons for Refusal dated May 30, 2019, issued in Japanese Application No. 2017-110647 (4 pages).

Office Action dated May 1, 2019, issued in U.S. Appl. No. 15/987,178 to Yamashita et al., filed May 23, 2018 (10 pages).

Steam, "A Different Kind of Gamepad", http://store.steampowered.com/livingroom/SteamController/, printed on Dec. 19, 2014, 10 pages.

Immersion, Patent Markings, retrieved Aug. 7, 2018, 2 pages. https://www.immersion.com/legal/trademarks-and-patent-markings/.

Office Action dated Jul. 31, 2019 issued in Japanese Application No. 2017-109999 (4 pgs.).

Office Action dated Aug. 6, 2019 issued in U.S. Appl. No. 15/987,261 (11 pgs.).

U.S. Appl. No. 15/987,178, filed May 23, 2018, Information Processing System, Non-Transitory Storage Medium Having Stored Therein Information Processing Program, Information Processing Apparatus, and Information Processing Method.

U.S. Appl. No. 15/987,261, filed May 23, 2018, Non-Transitory Storage Medium Having Stored Therein Game Program, Information Processing Apparatus, Information Processing System, and Information Processing Method.

U.S. Appl. No. 15/987,344, filed May 23, 2018, Information Processing System, Non-Transitory Storage Medium Having Stored Therein Information Processing Program, Information Processing Apparatus, and Information Processing Method.

* cited by examiner

F I G. 9
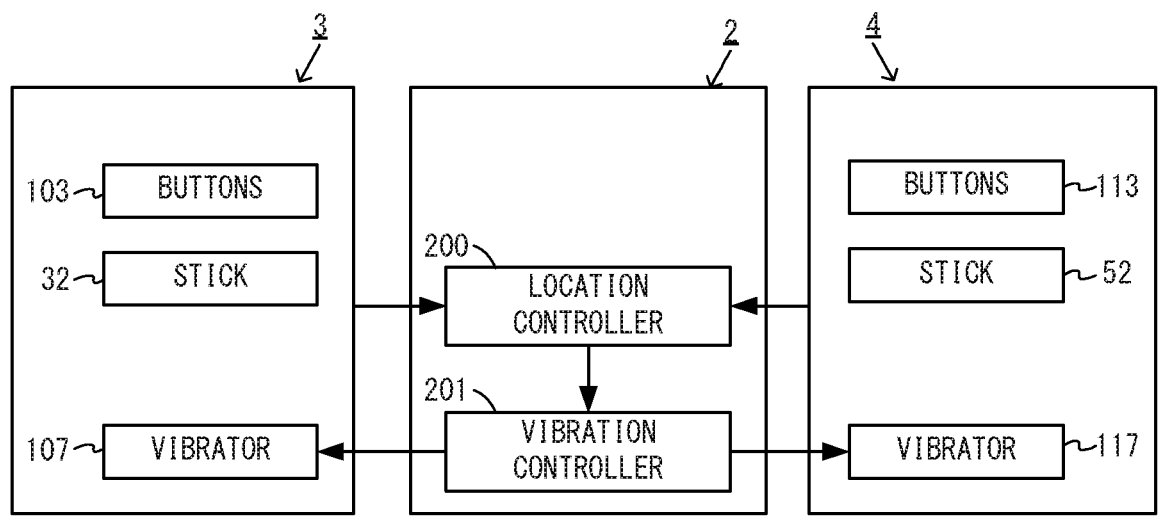

FIG. 12A
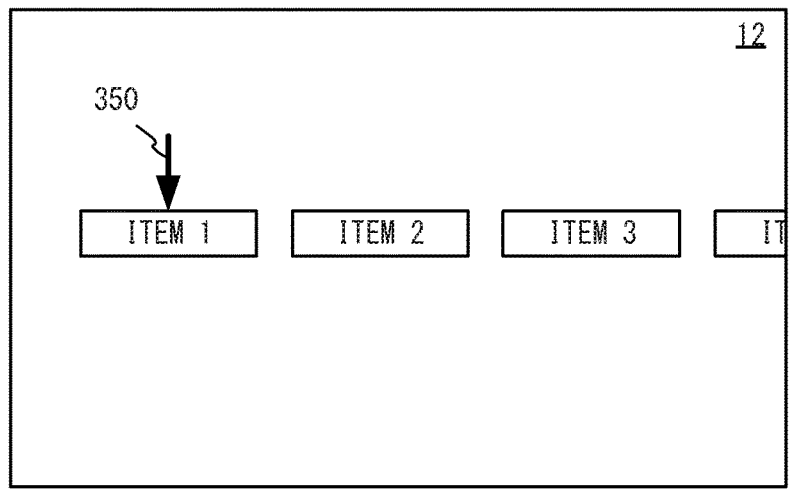
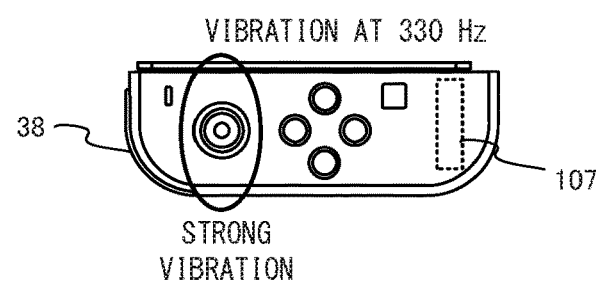
FIG. 12B
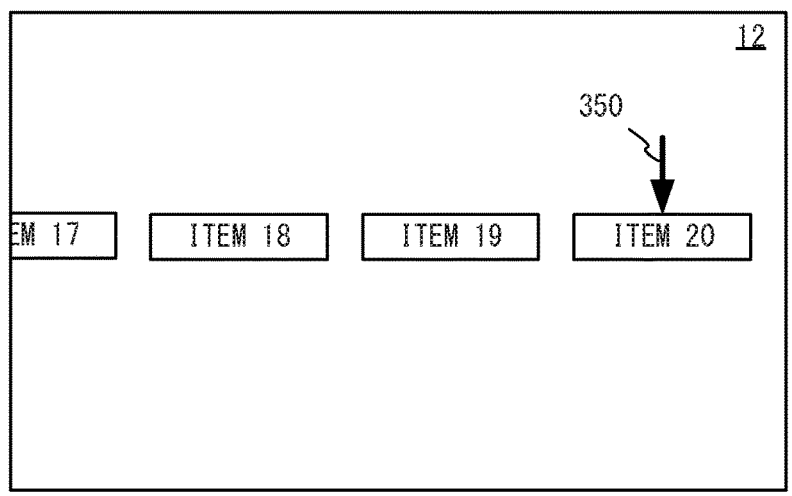
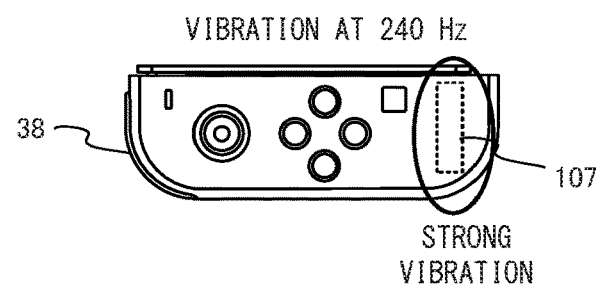

FIG. 13
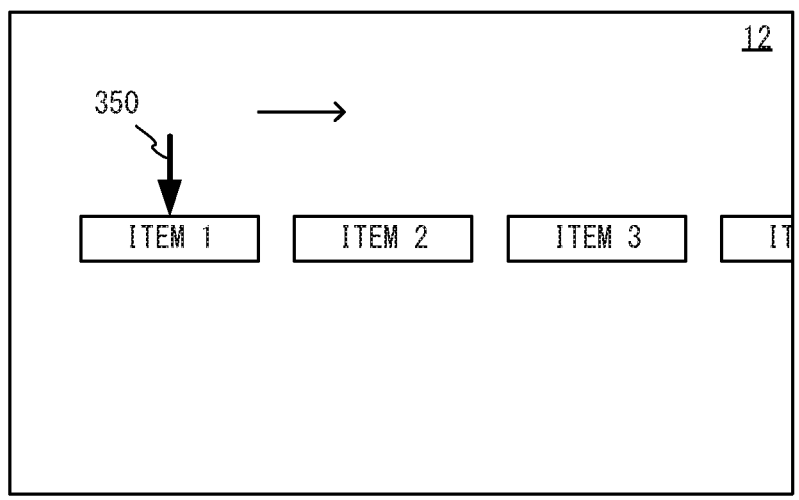
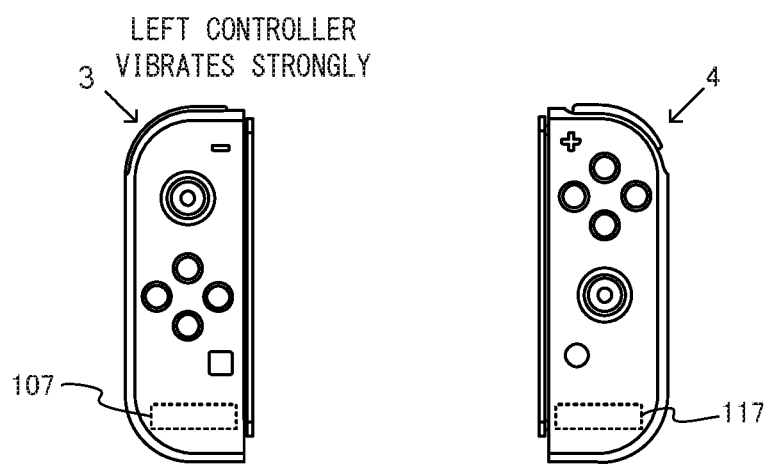

F I G. 1 8
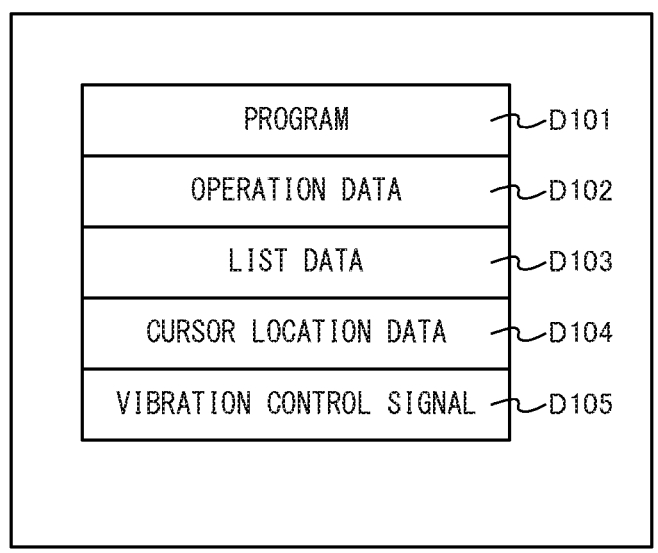

SYSTEMS, METHODS, AND/OR COMPUTER READABLE STORAGE MEDIUM HAVING PROGRAM, FOR LOCALIZED HAPTIC FEEDBACK BASED ON POSITION OF VIRTUAL OBJECT

CROSS REFERENCE TO RELATED APPLICATION

The disclosure of Japanese Patent Application No. 2017-110647, filed Jun. 5, 2017, is incorporated herein by reference.

FIELD

The present exemplary embodiment relates to an information processing system that causes a vibrator to vibrate, a non-transitory storage medium having stored therein the information processing program, an information processing apparatus, and an information processing method.

BACKGROUND AND SUMMARY

A system including two vibrators has conventionally been proposed. In the conventional system, a user is allowed to perceive or identify the location of a vibration source, based on the vibration strengths of the two vibrators.

However, the above conventional technique requires two vibrators in order to allow a user to perceive or identify the location of a vibration source.

Therefore, it is an object of the present exemplary embodiment to provide an information processing system, information processing program, information processing apparatus, and information processing method that allow a user to perceive various vibrations, using a single vibrator.

In order to achieve the object described above, the following configuration examples are exemplified.

An information processing system according to the exemplary embodiment includes an operation device including a vibrator configured to vibrate at a specified frequency, and a vibration controller configured to control a vibration of the vibrator. When the vibrator vibrates at a first frequency, a first portion of the operation device vibrates more strongly than the other portion of the operation device, and when the vibrator vibrates at a second frequency different from the first frequency, a second portion of the operation device different from the first portion vibrates more strongly than the other portion of the operation device. The vibration controller causes the vibrator to vibrate at the first frequency or the second frequency, based on an information process.

According to the above feature, when the vibrator is caused to vibrate at the first frequency, the first portion of the operation device vibrates strongly, and when the vibrator is caused to vibrate at the second frequency, the second portion of the operation device vibrates strongly. By allowing such an operation device to vibrate at a frequency based on an information process, the first or second portion of the operation device is allowed to vibrate strongly. The user is allowed to perceive the result of the information process, based on a portion of the operation device that vibrates strongly.

Further, in another feature, when the vibrator vibrates at the first frequency, the first portion may vibrate more strongly than the other portion, due to resonance.

According to the above feature, the first portion of the operation device is allowed to vibrate strongly due to resonance.

Further, in another feature, the second portion may be closer to the vibrator than the first portion is.

According to the above feature, when the vibrator vibrates at the second frequency, the second portion closer to the vibrator is allowed to vibrate strongly, and when the vibrator vibrates at the first frequency, the first portion distant from the vibrator is allowed to vibrate strongly.

Further, in another feature, the information processing system may further include a location controller configured to control a location of an operation object within a range, based on an operation performed on the operation device. When the operation object is located at a first location, the vibration controller may cause the vibrator to vibrate at the first frequency, and when the operation object is located at a second location, the vibration controller may cause the vibrator to vibrate at the second frequency.

According to the above feature, when the operation object is located at the first location, the first portion of the operation device is allowed to vibrate strongly, and when the operation object is located at the second location, the second portion of the operation device is allowed to vibrate strongly. Even when a single operation device is used, the user is allowed to perceive or identify the location of the operation object, based on a vibration.

Further, in another feature, when the operation object is located between the first location and the second location, the vibration controller may cause the vibrator to vibrate at the first frequency or the second frequency, according to the location of the operation object.

According to the above feature, when the operation object is located between the first location and the second location, one of the first and second portions of the operation device is allowed to vibrate strongly. Thus, portions of the operation device that vibrate strongly can be switched.

Further, in another feature, when the operation object is located between the first location and the second location, the vibration controller may cause the vibrator to vibrate at a middle frequency between the first frequency and the second frequency, according to the location of the operation object.

According to the above feature, when the operation object is located between the first location and the second location, the vibrator is allowed to vibrate at a middle frequency between the first frequency and the second frequency, according to the location of the operation object. For example, as the operation object is located closer to the first location (or the second location), the vibrator is allowed to vibrate a frequency closer to the first frequency (or the second frequency). As a result, the user is allowed to feel a difference in frequency, which in turn allows the user to perceive or identify the location of the operation object.

Further, in another feature, the vibration controller may be allowed to generate a first vibration signal containing the first frequency and a strength, and a second vibration signal containing the second frequency and a strength, and output the first and second vibration signals to the operation device. When the operation object is located between the first location and the second location, the vibration controller may determine the strength contained in the first vibration signal, and the strength contained in the second vibration signal, according to the location of the operation object, and output the first and second vibration signals containing the determined strengths to the operation device.

According to the above feature, the vibrator is allowed to vibrate, based on the two vibration signals. For example, by specifying the ratio of the vibration strengths, the vibrator is allowed to vibrate at the first frequency or the second frequency, or at a middle frequency between the first frequency and the second frequency.

Further, in another feature, the range may be a range of a list within which selection is allowed. The operation object may indicate a currently selected item in the list. The vibration controller may cause the vibrator to vibrate according to a location in the list of the currently selected item indicated by the operation object.

According to the above feature, the vibrator is allowed to vibrate at the first frequency or the second frequency, according to the location in the list of the currently selected item. For example, by causing the first portion of the operation device (e.g., the upper portion of the operation device) to vibrate strongly, the user is allowed to perceive that the currently selected item is located at a first location in the list (e.g., around an upper portion of items arranged in the vertical direction in the list).

Further, in another feature, the range may be a virtual space. The operation object may be a player character. The vibration controller may cause the vibrator to vibrate according to a relative positional relationship between a location in the virtual space and the player character.

According to the above feature, the vibrator is allowed to vibrate at the first frequency or the second frequency, according to the positional relationship between a player character and a location in the virtual space. For example, when a player character is located above a location, an upper portion of the operation device is allowed to vibrate strongly.

Further, in another feature, the operation device may include a first operation device and a second operation device. The first operation device may include a first vibrator configured to vibrate at a specified frequency. The second operation device may include a second vibrator configured to vibrate at a specified frequency. When the first vibrator vibrates at the first frequency, a first portion of the first operation device may vibrate more strongly than the other portion of the first operation device, and when the first vibrator vibrates at the second frequency, a second portion of the first operation device different from the first portion may vibrate more strongly than the other portion of the first operation device. When the second vibrator vibrates at the first frequency, a first portion of the second operation device may vibrate more strongly than the other portion of the second operation device, and when the second vibrator vibrates at the second frequency, a second portion of the second operation device different from the first portion may vibrate more strongly than the other portion of the second operation device. The vibration controller may cause the first vibrator to vibrate at the first frequency or the second frequency, and the second vibrator to vibrate at the first frequency or the second frequency, according to the positional relationship.

According to the above feature, the two operation devices can be used to allow the user to perceive the positional relationship. For example, the user is allowed to perceive a positional relationship between one object and another object, i.e., whether one object is located above, below, to the left of, or the the right of another object, based on which of the first portion of the the first operation device, the second portion of the first operation device, the first portion of the second operation device, and the second portion of the second operation device, vibrates strongly.

Further, an information processing system according to another exemplary embodiment may include an operation device including a vibrator configured to vibrate at a specified frequency, a vibration controller configured to control a vibration of the vibrator, and a location controller configured to control a location of an operation object within a range, based on an operation performed on the operation device. The vibration controller may cause the vibrator to vibrate at a frequency corresponding to the location of the operation object.

According to the above feature, the operating portion vibrates at a frequency corresponding to the location of the operation object. Therefore, the user is allowed to recognize or identify the location of the operation object by perceiving a difference in frequency.

Further, in another exemplary embodiment, an information processing program executable by a computer in the information processing system, or an information processing apparatus for executing the information processing program, may be provided. Further, in another exemplary embodiment, an information processing method for use in the information processing system may be provided.

According to the present exemplary embodiment, a single vibrator can be used to allow the user to perceive various vibrations.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 9 is an example non-limiting diagram showing an example of a functional configuration of a game system 1 according to the present exemplary embodiment;

FIG. 12A is an example non-limiting diagram showing an example of a selection screen in a case where a left controller 3 is held in the landscape orientation;

FIG. 12B is an example non-limiting diagram showing an example of a selection screen in a case where a left controller 3 is held in the landscape orientation;

FIG. 13 is an example non-limiting diagram showing an example of a selection screen in a case where a left controller 3 and a right controller 4 are used to allow a user to perceive or identify a location in a horizontal direction, based on a vibration;

FIG. 18 is an example non-limiting diagram showing an example of data stored in a main body apparatus 2 in the first example;

DETAILED DESCRIPTION OF NON-LIMITING EXAMPLE EMBODIMENTS

Figure 1:
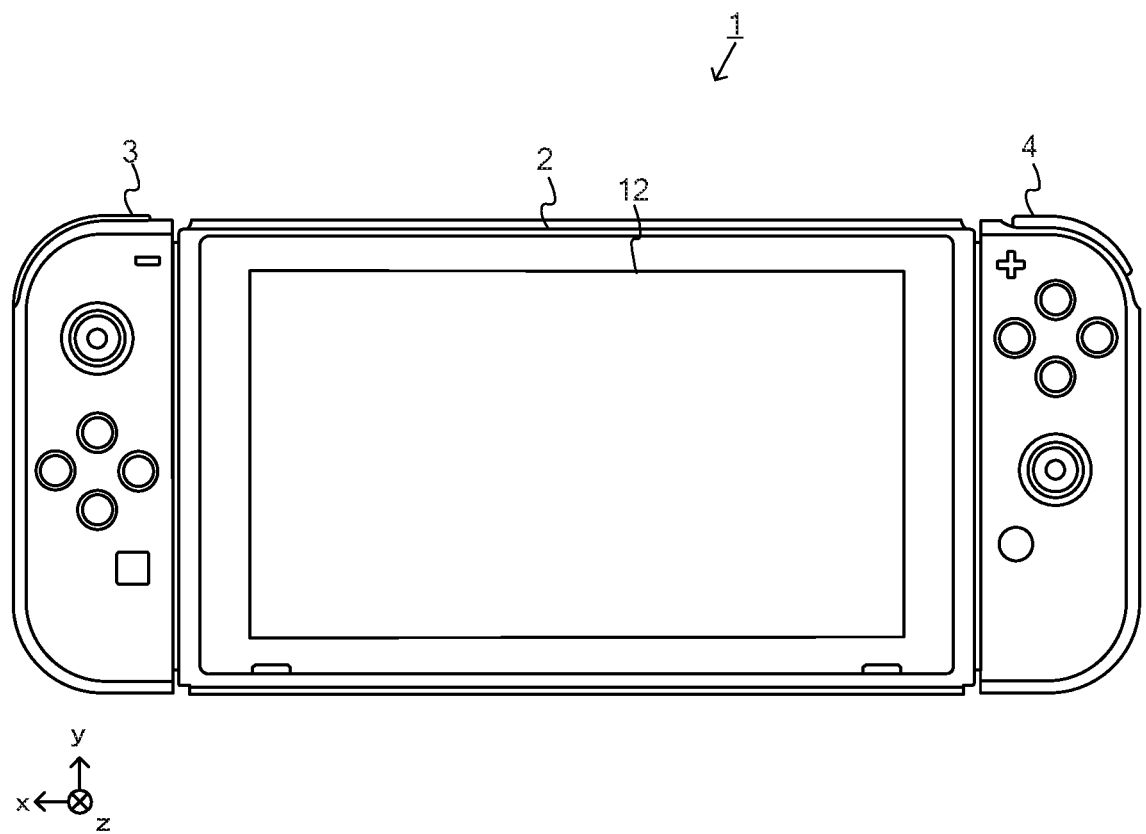
FIG. 1 is an example non-limiting diagram showing an example of a state in which a left controller 3 and a right controller 4 are attached to a main body apparatus 2.

A game system according to an example of an exemplary embodiment will now be described. An example of a game system 1 according to the exemplary embodiment includes a main body apparatus (an information processing apparatus that functions as a game apparatus main body in the exemplary embodiment) 2, a left controller 3, and a right controller 4. Each of the left and right controllers 3 and 4 is attachable to and detachable from the main body apparatus 2. That is, the game system 1 can be used as a unified apparatus obtained by attaching each of the left and right controllers 3 and 4 to the main body apparatus 2. Further, in the game system 1, the main body apparatus 2, the left controller 3, and the right controller 4 can also be used as separate bodies (see FIG. 2). In the description that follows, a hardware configuration of the game system 1 according to the exemplary embodiment is described, followed by a description of the control of the game system 1 according to the exemplary embodiment.

FIG. 1 is a diagram showing an example of the state in which the left and right controllers 3 and 4 are attached to the main body apparatus 2. As shown in FIG. 1, each of the left and right controllers 3 and 4 is attached to and unified with the main body apparatus 2. The main body apparatus 2 is for performing various processes (e.g., game processes) in the game system 1. The main body apparatus 2 includes a display 12. Each of the left and right controllers 3 and 4 includes operating portions with which a user provides inputs.

Figure 2:
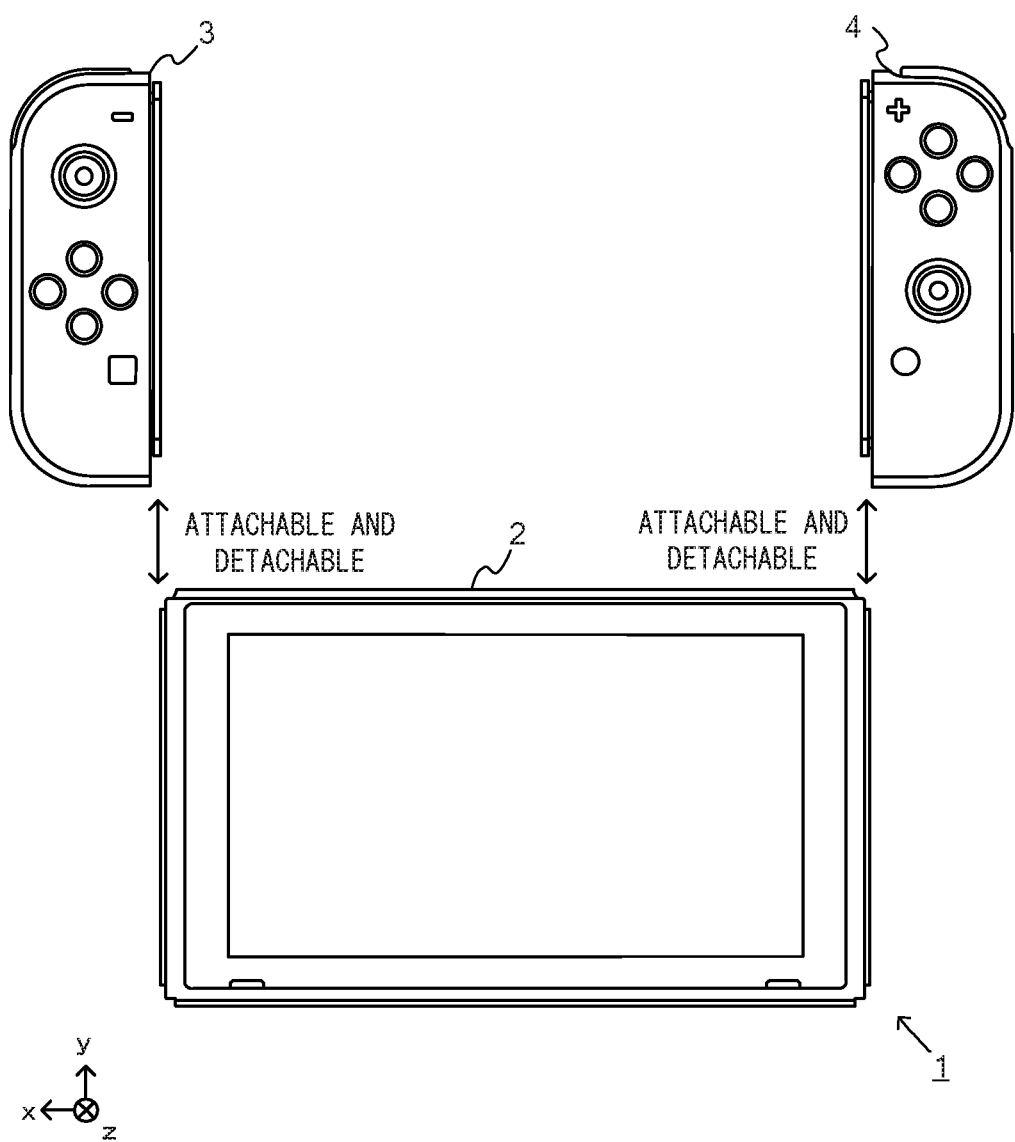
FIG. 2 is an example non-limiting diagram showing an example of a state in which each of left and right controllers 3 and 4 is detached from a main body apparatus 2.

FIG. 2 is a diagram showing an example of the state in which each of the left and right controllers 3 and 4 is detached from the main body apparatus 2. As shown in FIGS. 1 and 2, the left and right controllers 3 and 4 are attachable to and detachable from the main body apparatus 2. It should be noted that the left and right controllers 3 and 4 may also be hereinafter collectively referred to as "the controller" or "the controllers."

Figure 3:
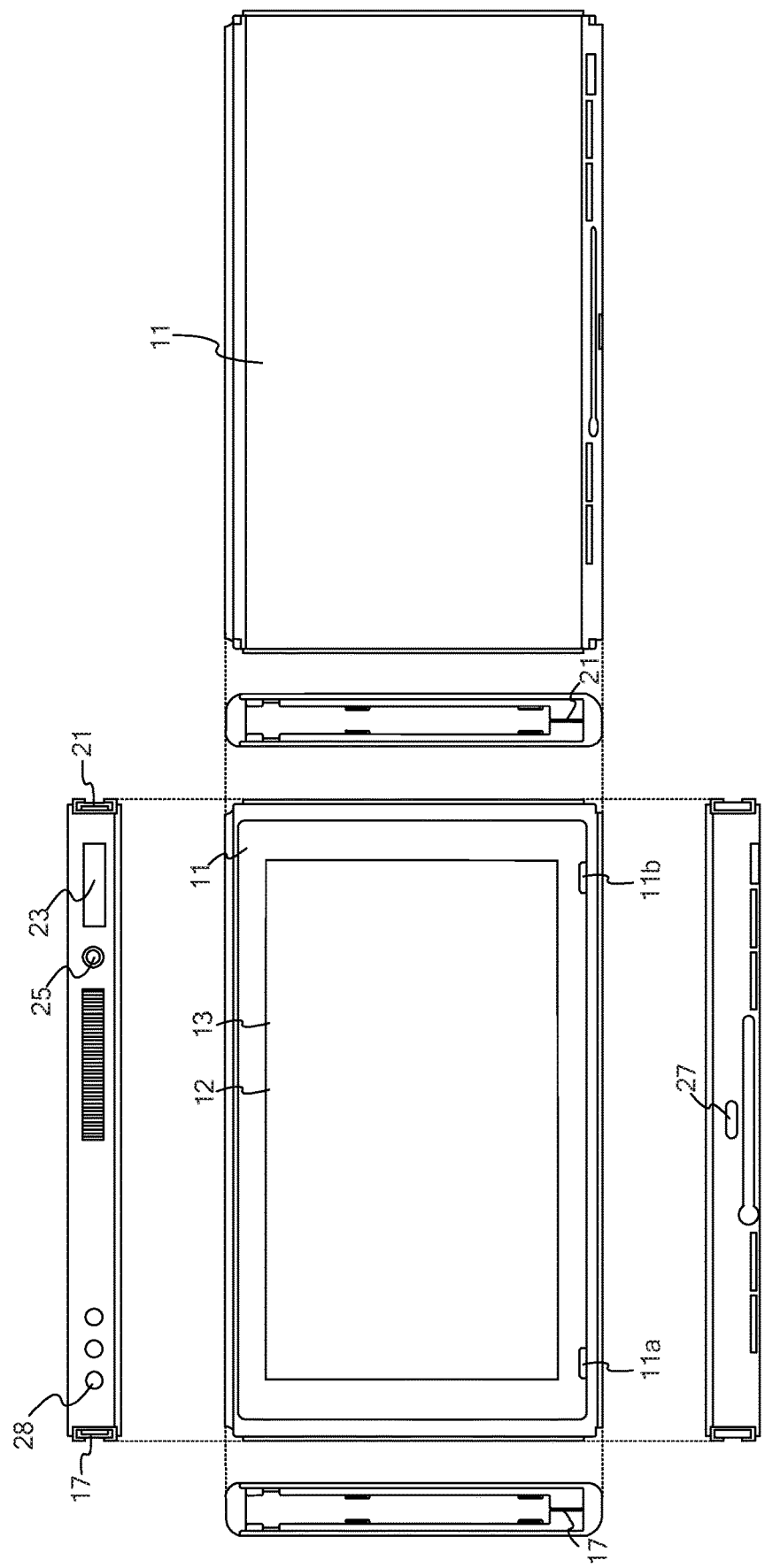
FIG. 3 is an example non-limiting diagram having six orthogonal views showing an example of a main body apparatus 2.

FIG. 3 is a diagram having six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the housing 11 may have any suitable shape and size. As an example, the housing 11 may be of a portable size. Further, the main body apparatus 2 alone or the unified apparatus obtained by attaching the left and right controllers 3 and 4 to the main body apparatus 2 may function as a mobile apparatus. The main body apparatus 2 or the unified apparatus may also function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be any type of display device.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed in the main surface of the housing 11. Then, output sounds of the speakers 88 are output through the speaker holes 11a and 11b.

Further, the main body apparatus 2 includes a left terminal 17 for allowing the main body apparatus 2 to perform wired communication with the left controller 3, and a right terminal 21 for allowing the main body apparatus 2 to perform wired communication with the right controller 4.

As shown in FIG. 3, the main body apparatus 2 includes a slot 23. The slot 23 is provided in an upper side surface of the housing 11. The slot 23 is so shaped as to allow a predetermined type of storage medium to be loaded in the slot 23. The predetermined type of storage medium is, for example, a dedicated storage medium (e.g., a dedicated memory card) to the game system 1 and an information processing apparatus of the same type as that of the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is for allowing the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle also functions as a hub device (specifically, a USB hub).

Figure 4:
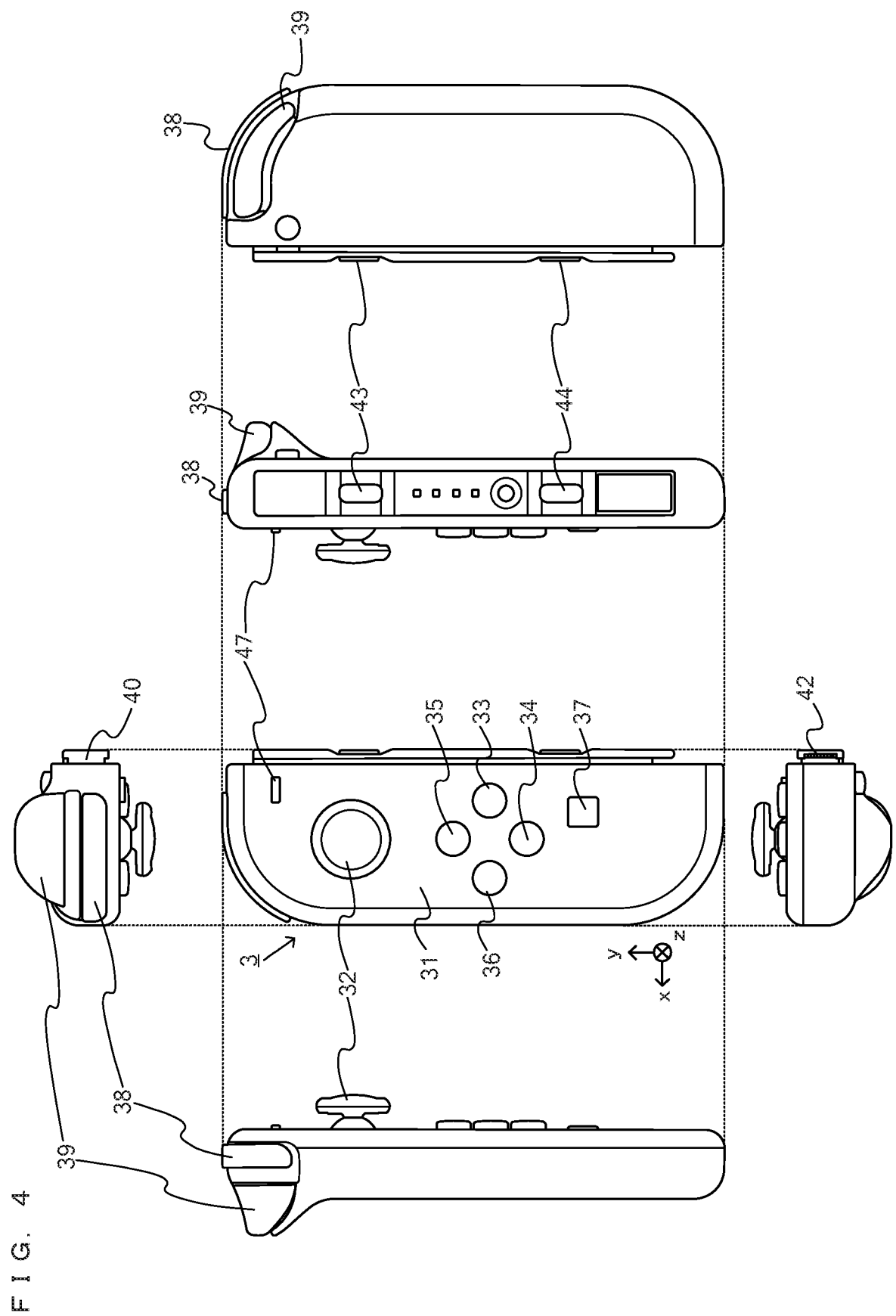
FIG. 4 is an example non-limiting diagram having six orthogonal views showing an example of a left controller 3.

FIG. 4 is a diagram having six orthogonal views showing an example of the left controller 3. As shown in FIG. 4, the left controller 3 includes a housing 31. In the exemplary embodiment, the housing 31 is longer than it is wide, i.e., is shaped to be long in the vertical direction (i.e., the y-axis direction shown in FIGS. 1 and 4). In the state in which the left controller 3 is detached from the main body apparatus 2, the left controller 3 can also be held in the portrait orientation. The housing 31 has such a shape and size that when held in the portrait orientation, the housing 31 can be held by one hand, particularly the left hand. Further, the left controller 3 can also be held in the landscape orientation. When held in the landscape orientation, the left controller 3 may be held by both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing down the analog stick 32.

The left controller 3 includes various operation buttons. The left controller 3 includes four operation buttons 33 to 36 (specifically, a "right" button 33, a "down" button 34, an "up" button 35, and a "left" button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for allowing the left controller 3 to perform wired communication with the main body apparatus 2.

Figure 5:
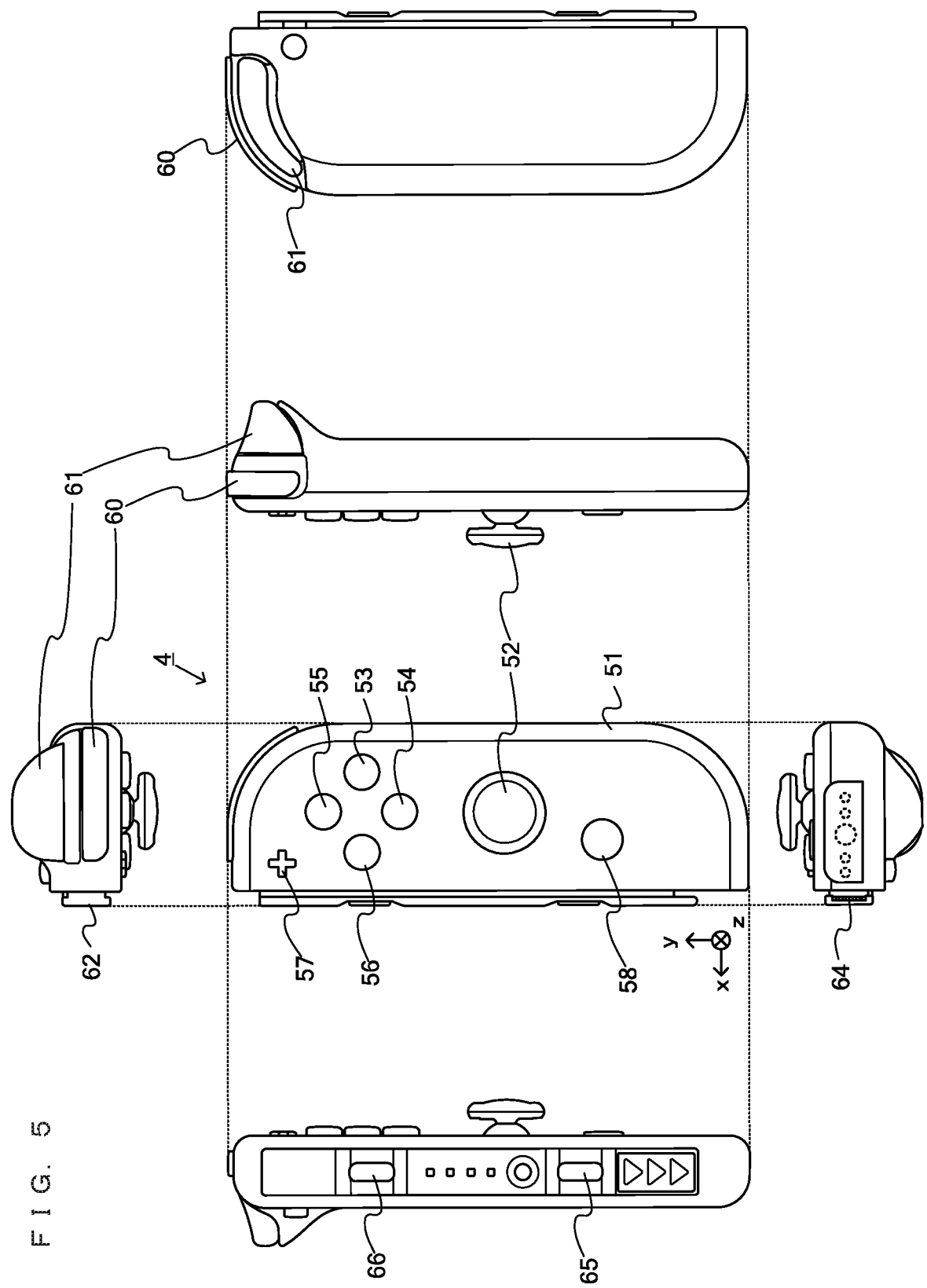
FIG. 5 is an example non-limiting diagram having six orthogonal views showing an example of a right controller 4.

FIG. 5 is a diagram having six orthogonal views showing an example of the right controller 4. As shown in FIG. 5, the right controller 4 includes a housing 51. In the exemplary embodiment, the housing 51 is longer than it is wide, i.e., is shaped to be long in the vertical direction. In the state in which the right controller 4 is detached from the main body apparatus 2, the right controller 4 can also be held in the portrait orientation. The housing 51 has such a shape and size that when held in the portrait orientation, the housing 51 can be held by one hand, particularly the right hand. Further, the right controller 4 can also be held in the landscape orientation. When held in the landscape orientation, the right controller 4 may be held by both hands.

As with the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, as with the left controller 3, the right controller 4 includes four operation buttons 53 to 56 (specifically, an A-button 53, a B-button 54, an X-button 55, and a Y-button 56). Further, the right controller 4 includes a "+" (plus) button 57 and a home button 58. Further, the right controller 4 includes a first R-button 60 and a ZR-button 61 in an upper right portion of a side surface of the housing 51. Further, as with the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
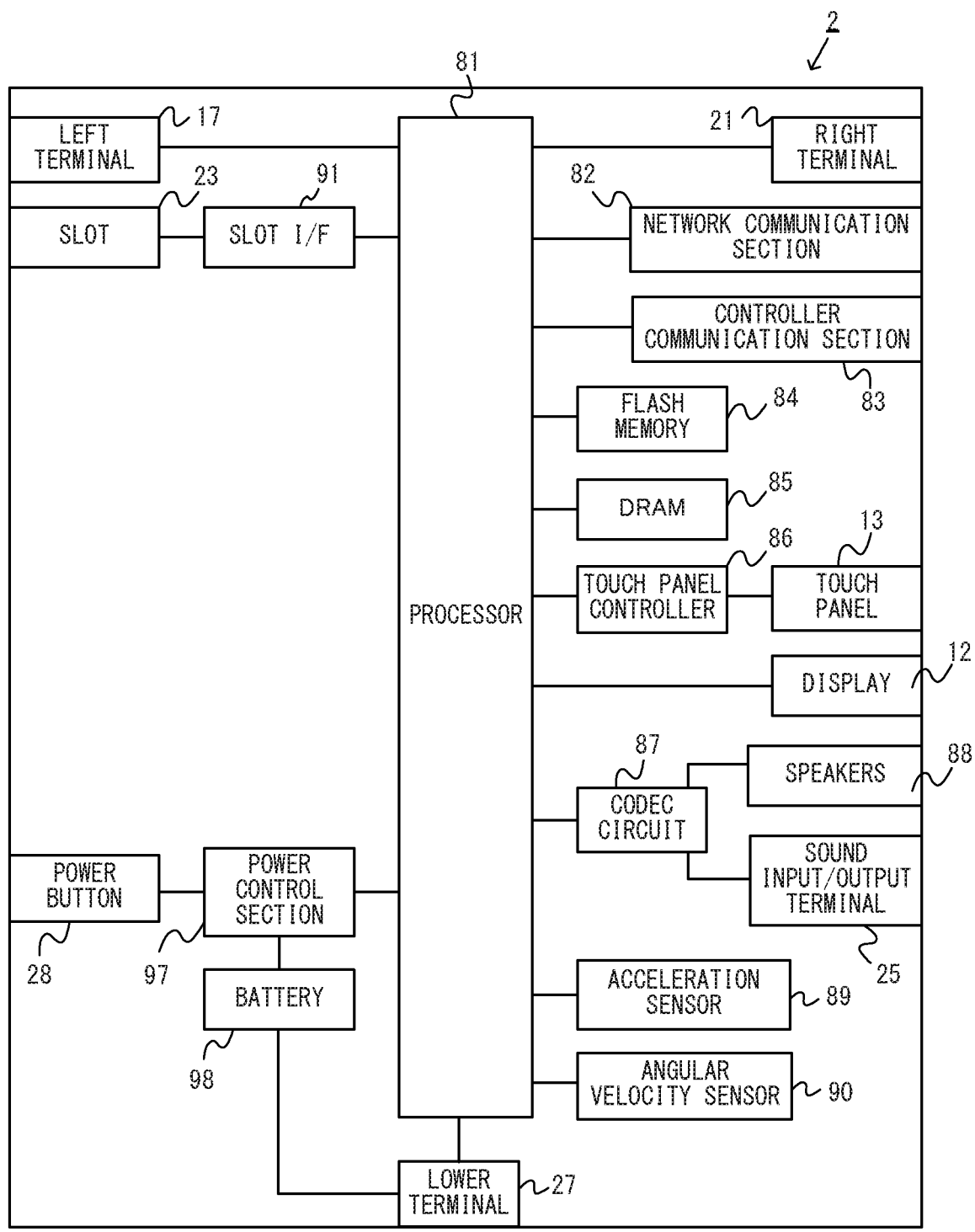
FIG. 6 is an example non-limiting block diagram showing an example of an internal configuration of a main body apparatus 2.

FIG. 6 is a block diagram showing an example of an internal configuration of the main body apparatus 2. The main body apparatus 2 includes components 81 to 91, 97, and 98 shown in FIG. 6 in addition to the components shown in FIG. 3. Some of the components 81 to 98 may be implemented as electronic parts on an electronic circuit board, which is accommodated in the housing 11.

The main body apparatus 2 includes a processor 81. The processor 81 is an information processing section for executing various types of information processing to be executed by the main body apparatus 2. For example, the CPU 81 may be composed only of a central processing unit (CPU), or may be a system-on-a-chip (SoC) having a plurality of functions such as a CPU function, a graphics processing unit (GPU) function, and the like. The processor 81 executes an information processing program (e.g., a game program) stored in a storage section (specifically, an internal storage medium such as a flash memory 84, an external storage medium that is loaded in the slot 23, or the like), thereby performing the various types of information processing.

The main body apparatus 2 includes a flash memory 84 and a dynamic random access memory (DRAM) 85 as examples of internal storage media built in the main body apparatus 2. The flash memory 84 and the DRAM 85 are coupled to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is coupled to the processor 81. The slot I/F 91 is coupled to the slot 23, and reads and writes data from and to the predetermined type of storage medium (e.g., a dedicated memory card) loaded in the slot 23, in accordance with instructions from the processor 81.

The processor 81 appropriately reads and writes data from and to the flash memory 84, the DRAM 85, and each of the above storage media, thereby performing the above information processing.

The main body apparatus 2 includes a network communication section 82. The network communication section 82 is coupled to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is coupled to the processor 81. The controller communication section 83 wirelessly communicates with the left controller 3 and/or the right controller 4. The main body apparatus 2 may communicate with the left and right controllers 3 and 4 using any suitable communication method. In the exemplary embodiment, the controller communication section 83 performs communication with the left and right controllers 3 and 4 in accordance with the Bluetooth (registered trademark) standard.

The processor 81 is coupled to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of the left and right controllers 3 and 4. As an example, a first user can provide an input to the main body apparatus 2 using a first set of the left and right controllers 3 and 4, and at the same time, a second user can provide an input to the main body apparatus 2 using a second set of the left and right controllers 3 and 4.

The main body apparatus 2 includes a touch panel controller 86 that is a circuit for controlling the touch panel 13. The touch panel controller 86 is coupled between the touch panel 13 and the processor 81. Based on a signal from the touch panel 13, the touch panel controller 86 generates, for example, data indicating a position where a touch input has been performed. Then, the touch panel controller 86 outputs the data to the processor 81.

Further, the display 12 is coupled to the processor 81. The processor 81 displays, on the display 12, a generated image (e.g., an image generated by executing the above information processing) and/or an externally acquired image.

The main body apparatus 2 includes a codec circuit 87 and speakers (specifically, a left speaker and a right speaker) 88. The codec circuit 87 is coupled to the speakers 88 and an audio input/output terminal 25 and also coupled to the processor 81. The codec circuit 87 is for controlling the input and output of audio data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., x-, y-, and z-axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the x-, y-, and z-axes shown in FIG. 2). It should be noted that the angular velocity sensor 90 may detect an angular velocity about one axis or angular velocities about two axes.

The acceleration sensor 89 and the angular velocity sensor 90 are coupled to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding a motion and/or orientation of the main body apparatus 2.

The main body apparatus 2 includes a power control section 97 and a battery 98. The power control section 97 is coupled to the battery 98 and the processor 81. Further, although not shown, the power control section 97 is coupled to components of the main body apparatus 2 (specifically, components that receive power supplied from the battery 98, the left terminal 17, and the right terminal 21). Based on a command from the processor 81, the power control section 97 controls the supply of power from the battery 98 to each of the above components.

Further, the battery 98 is coupled to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
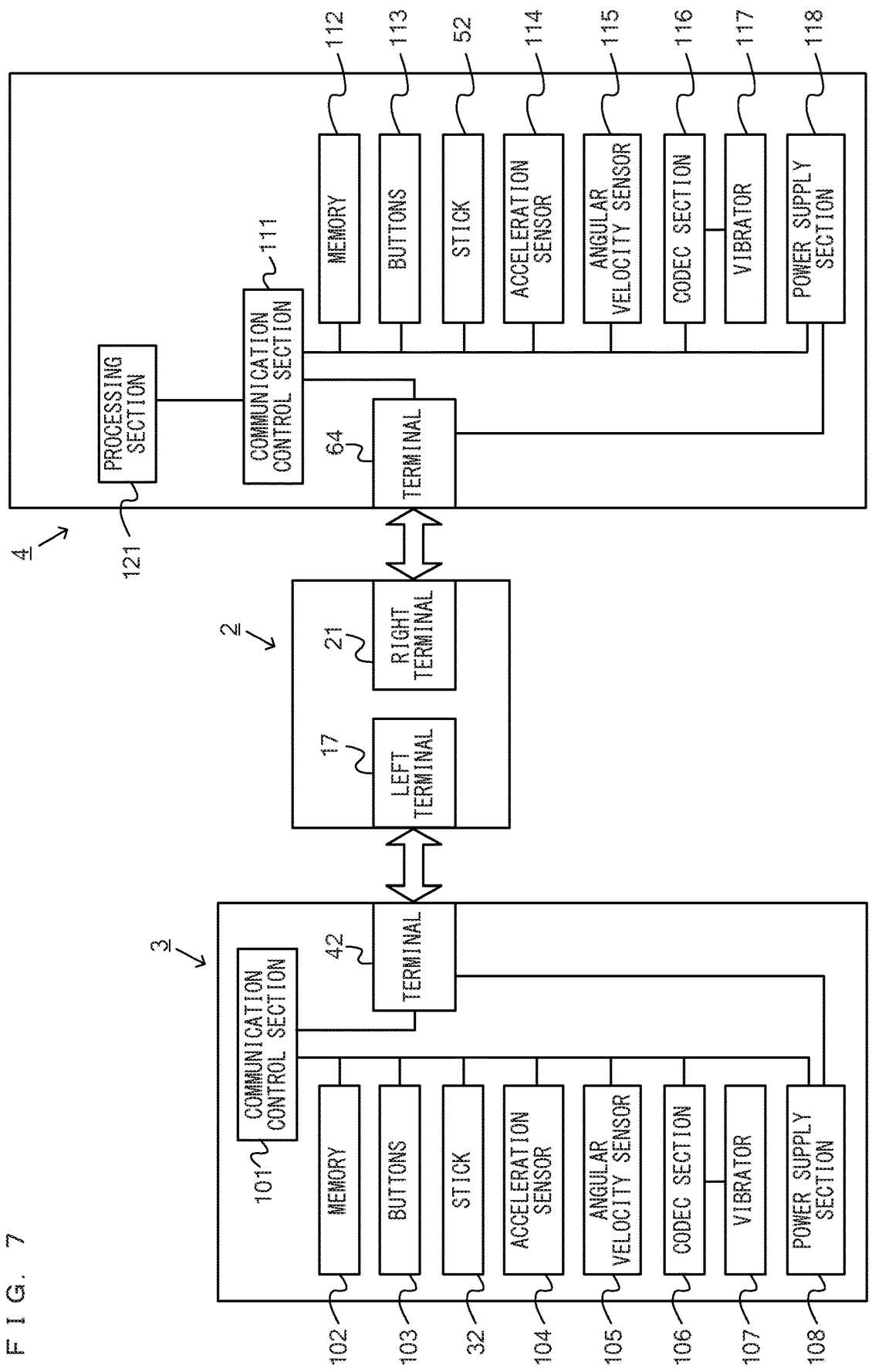
FIG. 7 is an example non-limiting block diagram showing examples of internal configurations of a main body apparatus 2, a left controller 3, and a right controller 4.

FIG. 7 is a block diagram showing examples of internal configurations of the main body apparatus 2, the left controller 3, and the right controller 4. It should be noted that the details of the internal configuration of the main body apparatus 2 are shown in FIG. 6 and therefore are not shown in FIG. 7.

The left controller 3 includes a communication control section 101 that communicates with the main body apparatus 2. As shown in FIG. 7, the communication control section 101 is coupled to components including the terminal 42. In the exemplary embodiment, the communication control section 101 can communicate with the main body apparatus 2 through both wired communication via the terminal 42 and wireless communication without via the terminal 42. The communication control section 101 controls a communication method which is performed by the left controller 3 with respect to the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. The buttons 103 and the analog stick 32 each output information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x-, y-, and z-axes shown in FIG. 5) directions. It should be noted that the acceleration sensor 104 may detect an acceleration along one axial direction or accelerations along two axial directions. Each of the acceleration sensor 104 and the angular velocity sensor 105 is coupled to the communication control section 101. Then, the detection results of the acceleration sensor 104 and the angular velocity sensor 105 are output to the communication control section 101 repeatedly at appropriate timings.

The communication control section 101 acquires information regarding an input (specifically, information regarding an operation or the detection result of a sensor) from each of input sections (specifically, the buttons 103, the analog stick 32, and the sensors 104 and 105). The communication control section 101 transmits operation data including the acquired information (or information acquired by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can acquire inputs provided to the left controller 3. That is, the main body apparatus 2 can determine operations performed on the buttons 103 and the analog stick 32 based on the operation data. Further, the main body apparatus 2 can calculate information regarding a motion and/or orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled in accordance with a command from the main body apparatus 2. That is, the communication control section 101, when receiving the above command from the main body apparatus 2, drives the vibrator 107 in accordance with the received command. Here, the left controller 3 includes a codec section 106. The communication control section 101, when receiving the above command, outputs a control signal corresponding to the command to the codec section 106. The codec section 106 generates a drive signal for driving the vibrator 107 from the control signal received from the communication control section 101, and outputs the drive signal to the vibrator 107. The vibrator 107 is operated according to the drive signal.

More specifically, the vibrator 107 is a linear vibration motor. Unlike a typical motor that provides a rotary motion, the linear vibration motor is driven in a predetermined direction according to an input voltage and therefore can be vibrated at an amplitude and frequency corresponding to the waveform of the input voltage. In the exemplary embodiment, a vibration control signal transmitted from the main body apparatus 2 to the left controller 3 may be a digital signal representing a frequency and an amplitude every unit of time. In another exemplary embodiment, the main body apparatus 2 may transmit information indicating the waveform itself. However, if only the amplitude and the frequency are transmitted, the amount of communication data can be reduced. In order to further reduce the amount of data, only the differences between the current values of the amplitude and the frequency at each time and the previous values may be transmitted, instead of the current values themselves. In this case, the codec section 106 converts the digital signal indicating the values of the amplitude and the frequency acquired from the communication control section 101 into an analog voltage waveform, and inputs a voltage to the vibrator 107 according to the resulting waveform, thereby driving the vibrator 107. Thus, the main body apparatus 2 changes the amplitude and frequency to be transmitted every unit of time, and thereby can control the amplitude and frequency with which the vibrator 107 is vibrated at each time. It should be noted that two or more different sets of amplitudes and frequencies indicating two or more waveforms may be transmitted from the main body apparatus 2 to the left controller 3, instead of a single set of amplitudes and frequencies indicating a single waveform. In this case, the codec section 106 combines waveforms indicated by the plurality of sets of amplitudes and frequencies thus received, and thereby can generate a single voltage waveform for controlling the vibrator 107.

The left controller 3 includes a power supply section 108. In the exemplary embodiment, the power supply section 108 includes a battery and a power control circuit. Although not shown, the power control circuit is coupled to the battery and also coupled to components of the left controller 3 (specifically, components that receive power supplied from the battery).

As shown in FIG. 7, the right controller 4 includes a communication control section 111 that communicates with the main body apparatus 2. Further, the right controller 4 includes a memory 112 that is coupled to the communication control section 111. The communication control section 111 is coupled to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication without via the terminal 64 (specifically, communication compliant with the Bluetooth (registered trademark) standard). The communication control section 111 controls a communication method that is performed by the right controller 4 with respect to the main body apparatus 2.

The right controller 4 includes input sections similar to those of the left controller 3. Specifically, the right controller 4 includes buttons 113, an analog stick 52, and inertial sensors (an acceleration sensor 114 and an angular velocity sensor 115). These input sections have functions similar to those of the input sections of the left controller 3 and operate in manners similar to those of the input sections of the left controller 3.

Further, the right controller 4 includes a vibrator 117 and a codec section 116. The vibrator 117 and the codec section 116 operate in manners similar to those of the vibrator 107 and the codec section 106, respectively, of the left controller 3. That is, the communication control section 111 operates the vibrator 117 using the codec section 116 in accordance with a command from the main body apparatus 2.

The right controller 4 includes a processing section 121. The processing section 121 is coupled to the communication control section 111.

The right controller 4 includes a power supply section 118. The power supply section 118 has a function similar to that of the power supply section 108 of the left controller 3, and operates in a similar manner.

Next, features of the vibrations of the left and right controllers 3 and 4 in the game system 1 according to the exemplary embodiment will be described.

Figure 8:
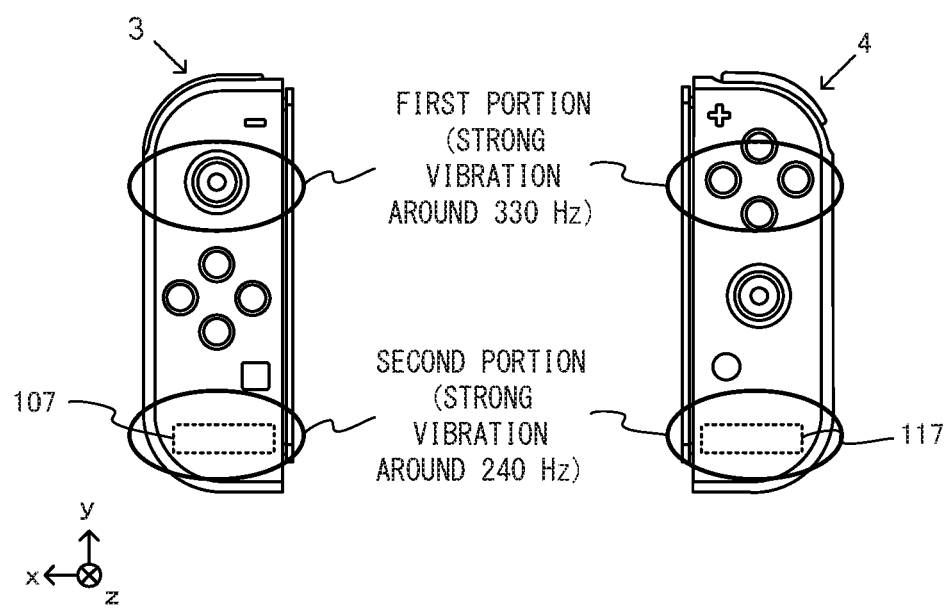
FIG. 8 is an example non-limiting diagram showing an example of portions of a left controller 3 and a right controller 4 that vibrate strongly when the vibrators of the left and right controllers 3 and 4 vibrate.

FIG. 8 is a diagram showing an example of portions of the left and right controllers 3 and 4 that vibrate strongly when the vibrators 107 and 117 of the left and right controllers 3 and 4 vibrate.

As shown in FIG. 8, the vibrator 107 is provided in a lower inner portion of the left controller 3. Similarly, the vibrator 117 is provided in a lower inner portion of the right controller 4. The vibrators 107 and 117 are configured to vibrate within a predetermined frequency range. In the left controller 3 of the exemplary embodiment, a first portion (upper portion) thereof vibrates more strongly than the other portion when the vibrator 107 is caused to vibrate at a first frequency, and a second portion (lower portion) thereof vibrates more strongly than the other portion when the vibrator 107 is caused to vibrate at a second frequency. Similarly, in the right controller 4, a first portion (upper portion) thereof vibrates more strongly than the other portion when the vibrator 117 is caused to vibrate at a first frequency, and a second portion (lower portion) thereof vibrates more strongly than the other portion when the vibrator 117 is caused to vibrate at a second frequency.

For example, when the vibrator 107 is caused to vibrate around 330 Hz, the upper portion of the left controller 3, which is distant from the vibrator 107, vibrates strongly. This is because the entire housing 31 of the left controller 3 resonates with the vibrator 107 due to the size (the length in the y-axis direction, the length in the x-axis direction, and the thickness in the z-axis direction) of the housing 31 of the left controller 3, the size, location, and weight of the vibrator 107, the location and weight of each component in the housing 31 of the left controller 3, etc.

The occurrence of such resonance is not limited to the case where the vibrator 107 is caused to vibrate at 330 Hz. Alternatively, for example, the resonance may occur when the vibrator 107 is caused to vibrate at 320 to 340 Hz. Further, the frequency of the vibration may be increased from a relatively low frequency (e.g., 240 Hz) to a relatively high frequency (e.g., 330 Hz). In this case, for example, the upper portion of the left controller 3 may start vibrating strongly around 310 Hz, and may vibrate most strongly around 330 Hz.

Meanwhile, for example, when the vibrator 107 is caused to vibrate around 240 Hz, the lower portion of the left controller 3 vibrates most strongly. This is because the lower portion is close to the location of the vibrator 107. The resonance does not occur at frequencies other than those around 330 Hz, and in this case, the lower portion of the left controller 3, in which the vibrator 107 is provided, vibrates most strongly. For example, the lower portion of the left controller 3 vibrates with substantially the same strength between when the vibrator 107 is caused to vibrate at a middle frequency (frequency of higher than around 240 Hz and lower than around 330 Hz) and when the vibrator 107 is caused to vibrate at 240 Hz, in which cases the amplitude is fixed.

It should be noted that the lower portion of the left controller 3 may vibrate more strongly when the vibrator 107 is caused to vibrate at 240 Hz than when the vibrator 107 is caused to vibrate at the middle frequency. Further, when the vibrator 107 is caused to vibrate at the middle frequency, a portion between the upper and lower portions of the left controller 3 (e.g., a portion in which the buttons 33 to 36 are provided or another portion that is closer to the lower portion than that portion is) may vibrate most strongly.

The same applies to the right controller 4. For example, when the vibrator 117 is caused to vibrate around 330 Hz, the upper portion of the right controller 4, which is distant from the vibrator 117, vibrates most strongly due to resonance. When the vibrator 117 is caused to vibrate around 240 Hz, the lower portion of the right controller 4, which is close to the vibrator 117, vibrates most strongly. When the vibrator 117 is caused to vibrate at a middle frequency (frequency of higher than around 240 Hz and lower than around 330 Hz), the lower portion of the right controller 4 may vibrate most strongly as in the case where the vibrator 117 is caused to vibrate around 240 Hz.

In the description that follows, an overview of vibration control according to the exemplary embodiment using the left and right controllers 3 and 4 having such properties will be firstly described. Afterwards, a description of specific examples will be provided.

FIG. 9 is a diagram showing an example of a functional configuration of the game system 1 according to the exemplary embodiment. As shown in FIG. 9, the main body apparatus 2 includes a location controller 200 and a vibration controller 201. The processor 81 of the main body apparatus 2 executes predetermined programs (a program D101, a game program D201, etc.) to function as the location controller 200 and the vibration controller 201. The predetermined program may, for example, be stored in an external storage medium that is loaded in the slot 23, or in the flash memory 84, or may be externally acquired via a network.

The location controller 200 performs a predetermined information process. Specifically, the location controller 200 acquires operation data corresponding to an operation performed by a player on the left controller 3 and/or the right controller 4, and based on the acquired operation data, controls a location of an operation object within a predetermined range. For example, the location controller 200 controls a location of a cursor 350 in a list described below, as an operation object, based on the operation data. Further, the location controller 200 controls a location of a player character P in a virtual space described below, as an operation object, based on the operation data.

The vibration controller 201 controls a vibration of the vibrator 107 of the left controller 3 and/or the vibrator 117 of the right controller 4. The vibration controller 201 generates a vibration control signal for controlling a vibration of the vibrator 107 and/or the vibrator 117, and outputs the generated vibration control signal to the left controller 3 and/or the right controller 4.

Specifically, the vibration controller 201 causes the vibrator 107 and/or the vibrator 117 to vibrate at a first frequency when an operation object controlled by the location controller 200 is located at a first location. Further, the vibration controller 201 causes the vibrator 107 and/or the vibrator 117 to vibrate at a second frequency when an operation object controlled by the location controller 200 is located at a second location.

First Example

Next, a first example will be described. In the first example, a selection process of selecting an item from a list having a plurality of items using one of the left and right controllers 3 and 4 is performed. In the selection process, the controller is caused to vibrate. In the description that follows, a case where the selection process is performed using the left controller 3 will be described. A similar selection process is performed when the right controller 4 is used.

Figure 10A:
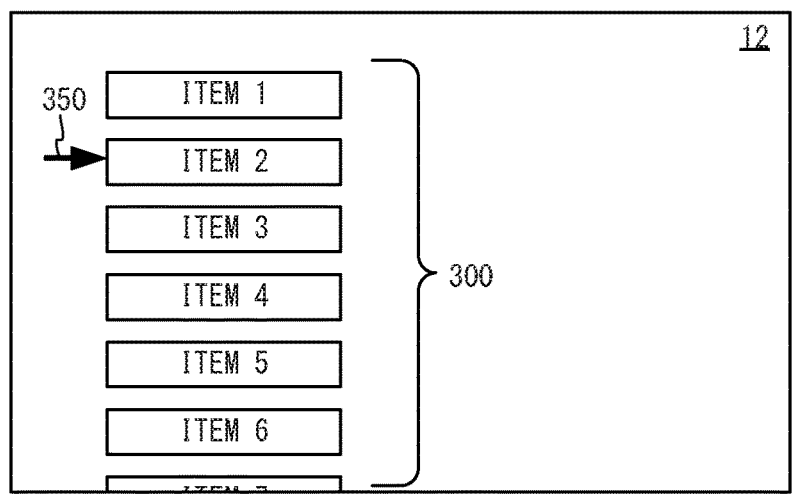
FIG. 10A is an example non-limiting diagram showing an example of an image displayed on a display 12 when selection is performed on a list in a first example.
Figure 10B:
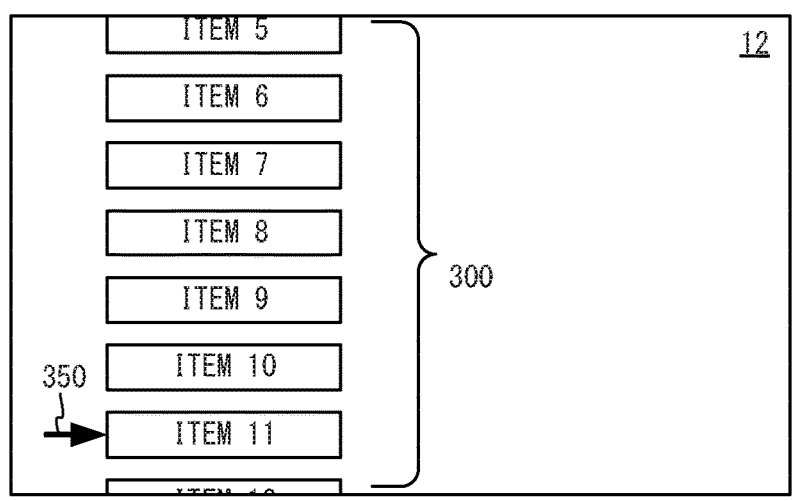
FIG. 10B is an example non-limiting diagram showing an example of an image displayed on a display 12 when selection is performed on a list in the first example.
Figure 10C:
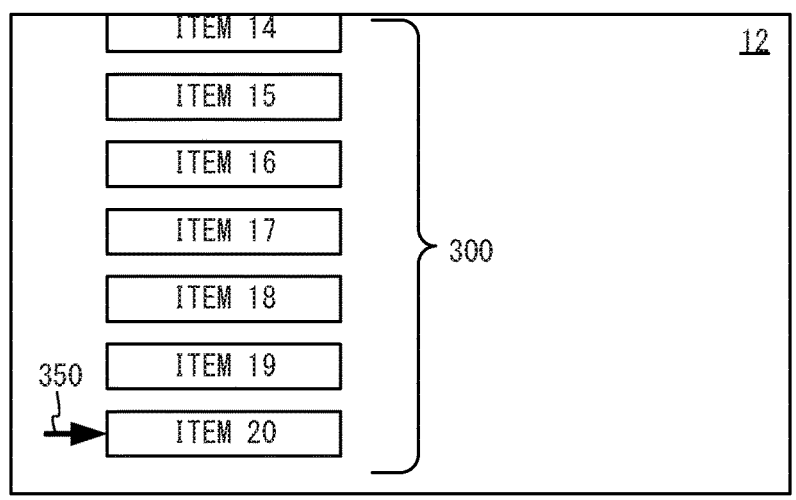
FIG. 10C is an example non-limiting diagram showing an example of an image displayed on a display 12 when selection is performed on a list in the first example.

FIGS. 10A to 10C are each a diagram showing an example of an image displayed on the display 12 when an item is selected from the list in the first example.

A selection screen shown in FIG. 10A is displayed in response to a user's operation during execution of a predetermined application (e.g., a game application). The selection screen displays a list 300 in which a plurality of items are arranged in the vertical direction. For example, the list 300 includes 20 items, i.e., an item 1 to an item 20. In the list 300, a portion of all the items is set as a display range. As shown in FIG. 10A, the items 1 to 6 of the list 300 are initially displayed on the screen. Further, the selection screen displays a cursor 350 that indicates a location of an item currently selected. The cursor 350 is initially set at the top (item 1) of the list 300.

The cursor 350 indicates an item currently selected. When a user inputs "down" using the stick 32 of the left controller 3, the cursor 350 moves downward. When the cursor 350 moves, the vibrator 107 of the left controller 3 vibrates. Specifically, the vibrator 107 vibrates at a frequency corresponding to the location in the list of an item that is indicated by the cursor 350 after the cursor 350 has been moved.

Figure 11:
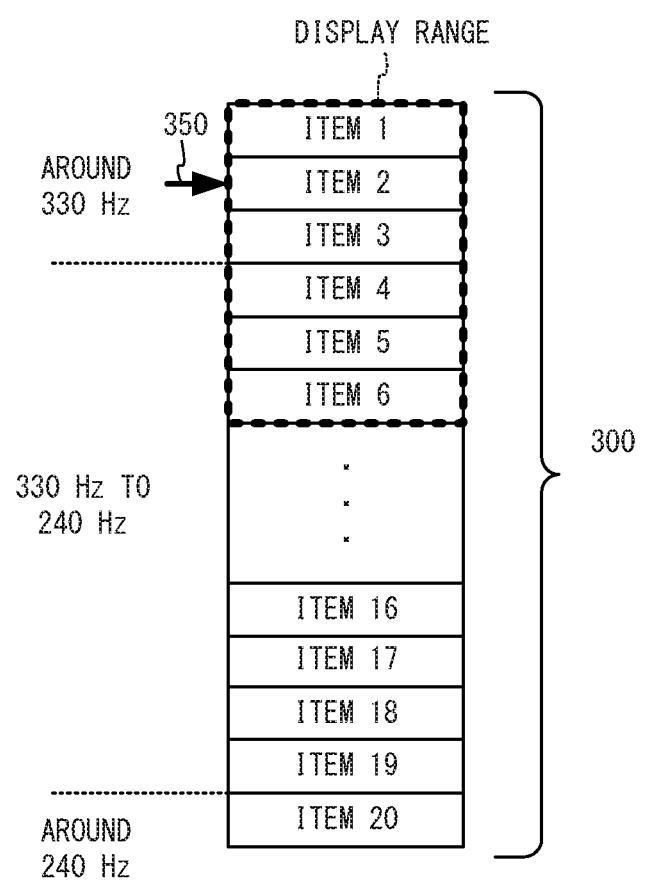
FIG. 11 is an example non-limiting diagram showing an example of a frequency corresponding to a location in a list of an item that is indicated by a cursor 350.

FIG. 11 is a diagram showing an example of a frequency corresponding to the location in the list of an item that is indicated by the cursor 350.

As shown in FIGS. 10A and 11, when the cursor 350 is located around the top of the list 300 (e.g., the items 1 to 3) after the cursor 350 has been moved, the vibrator 107 is caused to vibrate around 330 Hz. Specifically, the main body apparatus 2 generates a vibration control signal indicating a frequency of 330 Hz and an amplitude of a fixed value (e.g., "1"), and outputs the vibration control signal to the left controller 3. The left controller 3 causes the vibrator 107 to vibrate based on the vibration control signal from the main body apparatus 2.

As described above, when the vibrator 107 is caused to vibrate around 330 Hz, the upper portion of the left controller 3 vibrates most strongly due to resonance. The strong vibration of the upper portion of the left controller 3 allows the user to recognize that the currently selected item is located around the top of the list (items 1 to 3). It should be noted that when the cursor 350 is located within the range of the items 1 to 3, the frequency of the vibrator 107 may be changed within the range of 330 Hz to 320 Hz, for example.

For example, the frequency of the vibrator 107 is set to 330 Hz in a case where the cursor 350 is located at the "item 1," 325 Hz in a case where the cursor 350 is located at the "item 2," and 320 Hz in a case where the cursor 350 is located at the "item 3."

When the user continues to input "down" using the stick 32, the location of the cursor 350 (the location of a currently selected item) successively moves to the item 2 to the item 3. Each time the cursor 350 moves from item to item, the vibrator 107 vibrates. When the location of the cursor 350 reaches the item 6, the cursor 350 is displayed on a lower portion of the screen. In this situation, when the user continues to input "down" using the stick 32, the entire list moves upward with the cursor 350 remaining displayed at a lower portion of the screen, as shown in FIG. 10B.

Here, as shown in FIG. 11, when the cursor 350 moves to the locations of the item 4 and those following it, the vibrator 107 vibrates at a middle frequency (frequency of higher than around 240 Hz and lower than around 330 Hz). Specifically, the main body apparatus 2 generates a vibration control signal indicating a frequency corresponding to the location in the list of an item pointed by the cursor 350 and an amplitude of a fixed value (e.g., "1"), and outputs the vibration control signal to the left controller 3. For example, within the range of the items 4 to 19, the frequency of the vibrator 107 may be linearly changed within the range of 320 to 250 Hz according to the location of the cursor 350.

In the situation shown in FIG. 10B, when "down" is further input using the stick 32, the entire list 300 moves upward in the screen, and the cursor 350 moves to the last item 20 in the list, as shown in FIG. 10C. As shown in FIG. 11, when the cursor 350 moves to the bottom (item 20) of the list, the vibrator 107 vibrates around 240 Hz, for example. Specifically, the main body apparatus 2 generates and outputs a vibration control signal indicating a frequency of 240 Hz and an amplitude of a fixed value (e.g., "1").

As described above, when the vibrator 107 is caused to vibrate around 240 Hz, the lower portion of the left controller 3 vibrates most strongly. The strong vibration of the lower portion of the left controller 3 allows the user to recognize that a currently selected item is located around the bottom of the list.

It should be noted that when the cursor 350 is located around the bottom of the list (e.g., the items 18 to 20), the frequency of the vibrator 107 may be fixed to 240 Hz. In this case, as the location of the cursor 350 is changed from the item 4 to the item 17, the frequency of the vibrator 107 is decreased, for example, from 320 Hz to 250 Hz. When the cursor 350 is located at the item 18 and those following it, the frequency of the vibrator 107 is fixed to 240 Hz.

Thus, in the first example, the vibrator 107 is caused to vibrate at a frequency that varies according to the location in the list of a currently selected item, such that an upper or lower portion of the left controller 3 is caused to vibrate more strongly than the other portion. When a currently selected item is located at a first location (around the top) in the list, the vibrator 107 is caused to vibrate at a first frequency. When a currently selected item is located at a second location (around the bottom) in the list, the vibrator 107 is caused to vibrate at a second frequency. This vibration allows the user to recognize or identify the location in the list of a currently selected item.

Further, when a currently selected item is located in an upper portion (around the top) of the list, the upper portion of the left controller 3 vibrate strongly. When a currently selected item is located in a lower portion (around the bottom) of the list, the lower portion of the left controller 3 vibrates strongly. Therefore, the user is allowed to intuitively recognize or identify the location in the list of a currently selected item.

Further, the frequency of the vibrator 107 varies according to the location in the list of the cursor 350, and therefore, the user can feel a difference in the frequency, and thereby recognize or identify the location in the list of the cursor 350.

It should be noted that the left or right controller 3 or 4 may be held in the landscape orientation, and items in the list may be arranged in a horizontal direction in the selection screen. FIGS. 12A and 12B are each a diagram showing an example of a selection screen in a case where the left controller 3 is held in the landscape orientation.

As shown in FIG. 12A, when the items 1 to 20 are successively arranged from left to right, the left controller 3 is held in the landscape orientation such that the first L-button 38 is located on the left side (the vibrator 107 is located on the right side). In this case, when the cursor 350 points the item 1, the vibrator 107 is caused to vibrate around 330 Hz, so that a left portion (an upper portion when the left controller 3 is held in the portrait orientation) of the left controller 3 vibrates most strongly.

Further, as shown in FIG. 12B, when the cursor 350 points the item 20, the vibrator 107 is caused to vibrate around 240 Hz, so that a right portion (a lower portion when the left controller 3 is held in the portrait orientation) of the left controller 3 vibrates most strongly.

When the cursor 350 is located at a middle between the item 1 and the item 20, the vibrator 107 vibrates at a frequency corresponding to the location of the cursor 350 (frequency of higher than around 240 Hz and lower than around 330 Hz).

Thus, even when the controller is held in the landscape orientation, the location of a portion of the controller that vibrates most strongly corresponds to the location in the list of a currently selected item, and therefore, the vibration of the controller allows the user to intuitively recognize or identify the location in the list of the currently selected item.

It should be noted that when items in the list are arranged in a horizontal direction, both the left and right controllers 3 and 4 may be used to allow the user to recognize or identify the location of a currently selected item.

FIG. 13 is a diagram showing an example of a selection screen in a case where the left and right controllers 3 and 4 are used to allow the user to perceive or identify a location in a horizontal direction, based on a vibration.

It is assumed that the user holds the left controller 3 with their left hand, and the right controller 4 with their right hand. As shown in FIG. 13, when the items 1 to 20 are successively arranged from left to right, then if the item 1, which is located at the leftmost position, is selected, the left controller 3 is caused to vibrate more strongly than the right controller 4. Further, although not shown, when the item 20, which is located at the rightmost position, the right controller 4 is caused to vibrate more strongly than the left controller 3. Further, when the item 10, which is located in a middle of the list, is selected, the left and right controllers 3 and 4 are caused to vibrate with the same strength. Thus, by changing the vibration strength ratio of the left and right controllers 3 and 4, the user can recognize or identify the location in the list of a currently selected item (an item pointed by the cursor 350).

In the first example, by associating the location in the list of a currently selected item with the location of a portion of the controller that vibrates strongly, the user is allowed to easily recognize or identify the location of a currently selected item. Meanwhile, the relationship between the location in the list of a currently selected item and the location of a portion of the controller that vibrates strongly may be reversed with respect to that of the first example. In this case, the user can feel the movement of the entire list instead of the location of a currently selected item.

Second Example

Next, a second example will be described. In the second example, the left and right controllers 3 and 4 are used to play a game in which a player tries to find an object that is a vibration source provided in a virtual space.

Figure 14:
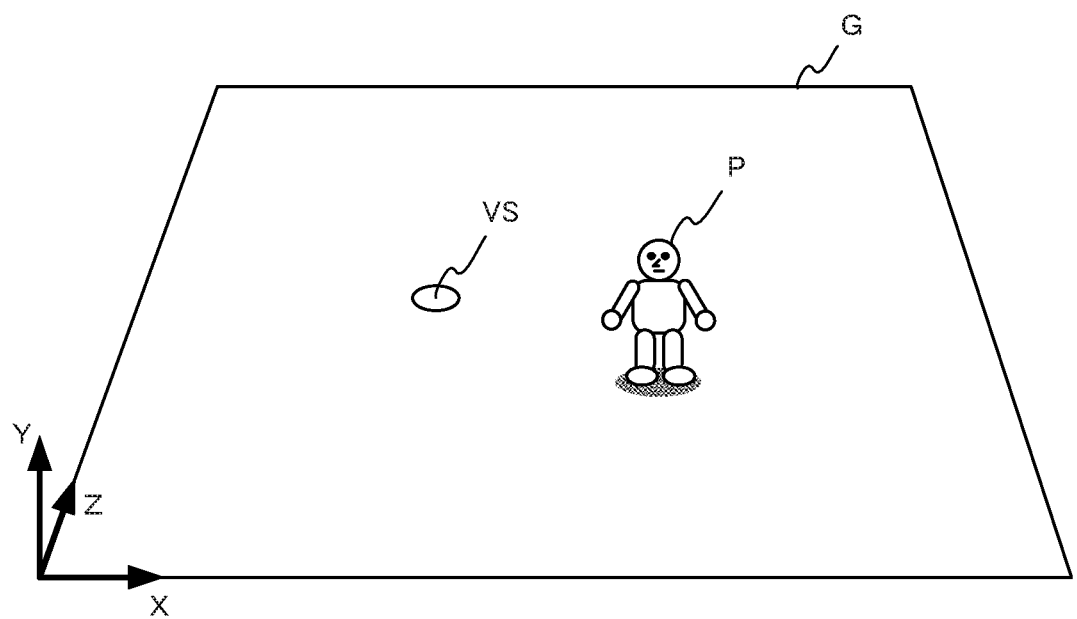
FIG. 14 is an example non-limiting diagram showing an example of a virtual space in a case where a game according to a second example is played.

FIG. 14 is a diagram showing an example of the virtual space in a case where the game according to the second example is played.

As shown in FIG. 14, an XYZ coordinate system is specified in the virtual space. For example, the X-axis extends in the rightward direction of the virtual space, the Y-axis extends in the height direction of the virtual space, and the Z-axis extends in the depth direction of the virtual space.

A player character P, a ground object G, and a vibration object VS as a vibration source are provided in the virtual space. Further, a virtual camera is provided in the virtual space. The virtual camera is fixed to a location where the virtual camera views the entire ground object G obliquely from above. When the game according to the second example is being played, an image as shown in FIG. 14 may be displayed on the display 12 (or other display devices).

The ground object G is, for example, a plane that is parallel to the XZ plane. It should be noted that the ground object G may be a curved surface. Further, the ground object G may undulate. Other objects may be provided on the ground object G.

The vibration object VS generates a vibration. The vibration object VS is buried under the ground object G Therefore, the vibration object VS is not displayed on the screen of the display 12.

The player character P moves on the ground object G, based on an operation performed on the stick 32 of the left controller 3.

In the game according to the second example, the frequencies and strengths (amplitudes) of vibrations of the vibrators 107 and 117 of the left and right controllers 3 and 4 are controlled according to a positional relationship between the player character P and the vibration object VS. Specifically, the frequencies of vibrations of the vibrators 107 and 117 are controlled according to a positional relationship between the player character P and the vibration object VS in the Z-axis direction (the vertical direction on the screen).

For example, when the vibration object VS is located further than the player character P in the positive direction of the Z-axis (the upward direction on the screen) (the player character P is located at a first location), the vibrators 107 and 117 vibrate at a first frequency (around 330 Hz). As a result, the upper portions of the left and right controllers 3 and 4 vibrate strongly. Further, when the vibration object VS is located further than the player character P in the negative direction of the Z-axis (the downward direction on the screen) (the player character P is located at a second location), the vibrators 107 and 117 vibrate at a second frequency (around 240 Hz). As a result, the lower portions of the left and right controllers 3 and 4 vibrate strongly. Further, the location of the vibration object VS coincides with the location of the player character Pin the Z-axis direction, the vibrators 107 and 117 vibrate at a middle frequency (e.g., around 280 Hz) between the first and second frequencies.

It should be noted that when the vibration object VS is located further than the player character P in the positive direction of the Z-axis, and the difference in Z-coordinate value between the vibration object VS and the player character P is greater than or equal to a predetermined value (the player character P is located at a first location), the vibrators 107 and 117 may vibrate at a first frequency. Further, when the vibration object VS is located further than the player character P in the negative direction of the Z-axis, and the difference in Z-coordinate value between the vibration object VS and the player character P is greater than or equal to a predetermined value (the player character P is located at a second location), the vibrators 107 and 117 may vibrate at a second frequency. In this case, when the player character P is located between the first and second locations, the vibrators 107 and 117 may vibrate at a middle frequency between the first and second frequencies, according to the location of the player character P.

Further, when the difference in Z-coordinate value between the vibration object VS and the player character P is smaller than the predetermined value, the frequencies of the vibrators 107 and 117 may be fixed to a reference value (e.g., 280 Hz). When the player character P moves in the positive direction of the Z-axis from the location where the frequencies of the vibrators 107 and 117 are set to the reference value, so that the difference in Z-coordinate value becomes greater than or equal to the predetermined value, the frequencies of the vibrators 107 and 117 may be changed to a value (e.g., 240 Hz) smaller than the reference value. Alternatively, when the player character P moves in the negative direction of the Z-axis from the location where the frequencies of the vibrators 107 and 117 are set to the reference value, so that the difference in Z-coordinate value becomes greater than or equal to the predetermined value, the frequencies of the vibrators 107 and 117 may be changed to a value (e.g., 330 Hz) greater than the reference value.

The amplitudes of vibrations of the vibrators 107 and 117 are controlled according to a distance between the player character P and the vibration object VS. Further, the amplitudes are controlled according to a positional relationship between the player character P and the vibration object VS in the X-axis direction (the horizontal direction on the screen).

Specifically, the amplitudes of vibrations of the vibrators 107 and 117 increase with a decrease in the distance between the player character P and the vibration object VS. When the player character P is located directly above the vibration object VS, the amplitudes of vibrations of the vibrators 107 and 117 are maximum (e.g., the amplitudes are set to "1"). When the distance between the player character P and the vibration object VS is greater than or equal to a predetermined value, the amplitudes of vibrations of the vibrators 107 and 117 are zero.

Further, for example, when the vibration object VS is located to the left of the player character P, the vibrators 107 and 117 vibrate such that the left controller 3 vibrates more strongly than the right controller 4. When the vibration object VS is located to the right of the player character P, the vibrators 107 and 117 vibrate such that the right controller 4 vibrates more strongly than the left controller 3. Further, when the player character P is located on a straight line that passes through the vibration object VS and extends parallel to the Z-axis (i.e., the vibration object VS and the player character P are not away from each other in the horizontal direction), the left and right controllers 3 and 4 vibrate with the same strength.

The player estimates the location of the vibration object VS based on the vibrations of the left and right controllers 3 and 4 that the player feels. For example, when the upper portions of the left controller 3 and/or the right controller 4 vibrate more strongly than the other portions, the player can estimate that the vibration object VS is buried above the player character P (the upper side of the screen). Further, for example, when the left controller 3 vibrates more strongly than the right controller 4, the player can estimate that the vibration object VS is buried to the left of the player character P. When the vibrations of the left and right controllers 3 and 4 are weak, the player can estimate that the vibration object VS is distant from the player character P.

Thus, the player estimates the location in the Z-axis direction of the vibration object VS, based on whether the upper portions or lower portions of the left controller 3 and/or the right controller 4 are vibrating strongly. Further, the player estimates the distance between the player character P and the vibration object VS and the location in the X-axis direction of the vibration object VS, based on the vibration strengths of the left and right controllers 3 and 4 and the ratio thereof. Thereafter, the player moves the player character P to the estimated location, and performs a specific operation (e.g., an operation of pressing down the A-button 53, and at the same time, pressing down the ZR button 61). If the vibration object VS is present under the estimated location, the player character P can get a predetermined item.

Figure 15:
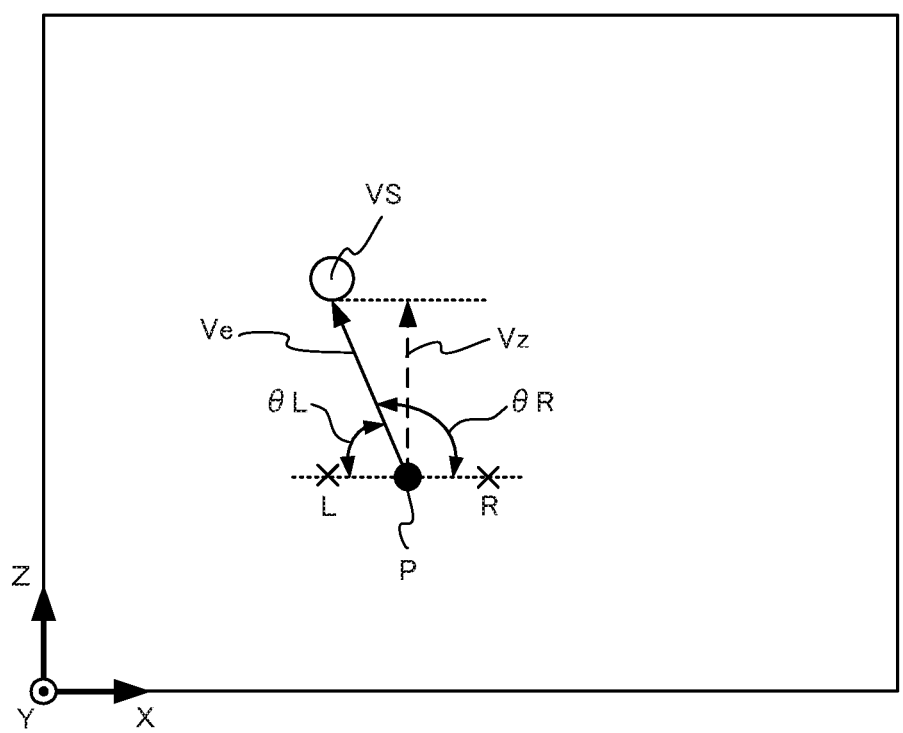
FIG. 15 is an example non-limiting diagram for describing control of a vibration according to a positional relationship between a player character P and a vibration object VS.
Figure 16:
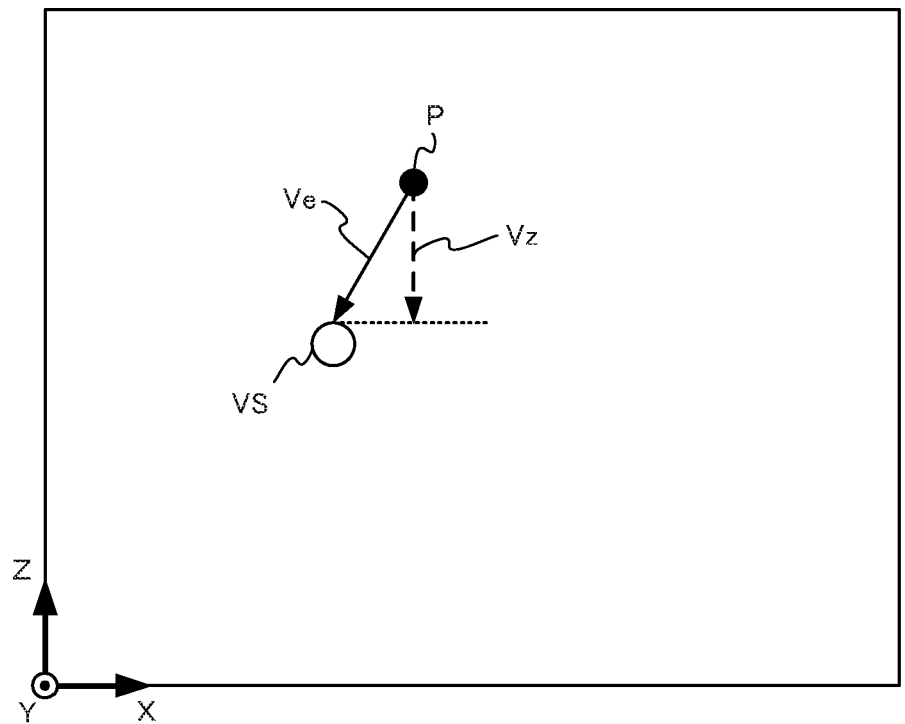
FIG. 16 is an example non-limiting diagram showing an example of a case where a vibration object VS is located further than a player character P in the negative direction of the Z-axis.
Figure 17:
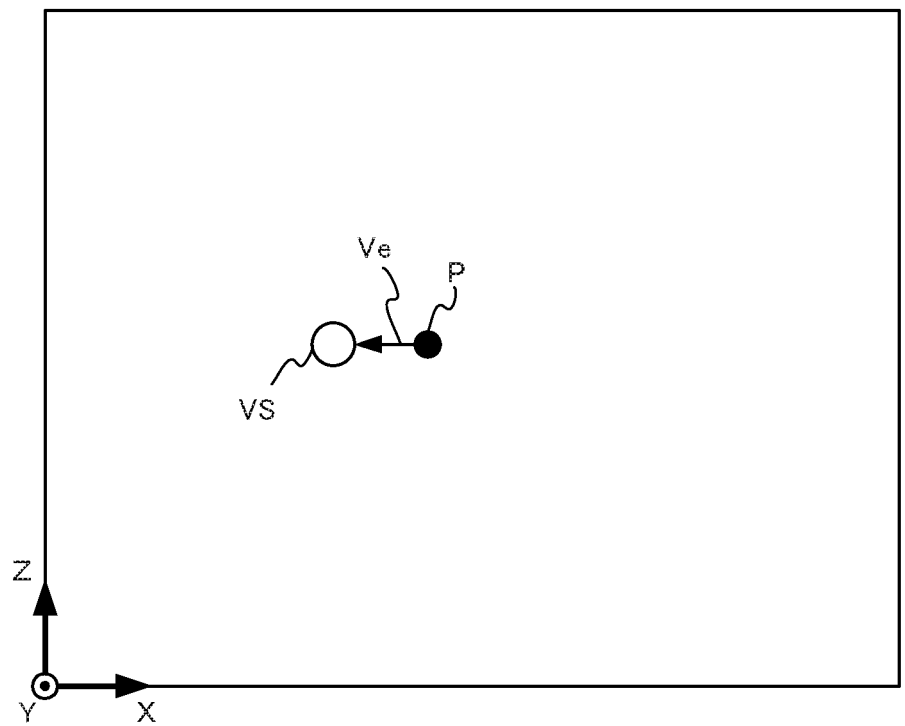
FIG. 17 is an example non-limiting diagram showing an example of a case where a location of a player character P coincides with a location of a vibration object VS in the Z-axis direction.

Next, the control of the vibrators 107 and 117 of the left and right controllers 3 and 4 will be specifically described. FIG. 15 is a diagram for describing the control of vibrations according to the positional relationship between the player character P and the vibration object VS. FIG. 16 is a diagram showing an example of a case where the vibration object VS is located further than the player character P in the negative direction of the Z-axis. FIG. 17 is a diagram showing an example of a case where the location of the player character P coincides with the location of the vibration object VS in the Z-axis direction. FIGS. 15 to 17 are diagrams of the virtual space as viewed from above.

As shown in FIG. 15, initially, a vector Ve pointing from the location of the player character P to the location of the vibration object VS is calculated. The frequencies of the vibrators 107 and 117 are set based on a vector Vz that is the Z-axis component of the vector Ve. For example, as shown in FIG. 15, when the direction of the vector Vz is the same as the positive direction of the Z-axis, the frequencies of the vibrators 107 and 117 are set to 330 Hz. Therefore, in the case of the positional relationship of FIG. 15, the upper portions of the left and right controllers 3 and 4 vibrate more strongly than the other portions. It should be noted that when the magnitude of the vector Vz is greater than or equal to a predetermined value (>0), and the direction of the vector Vz is the same as the positive direction of the Z-axis, the frequencies of the vibrators 107 and 117 may be set to 330 Hz.

Further, as shown in FIG. 16, when the direction of the vector Vz that is the Z-axis component of the vector Ve is the same as the negative direction of the Z-axis, the frequencies of the vibrators 107 and 117 are set to 240 Hz. Therefore, in the case of the positional relationship of FIG. 16, the lower portions of the left and right controllers 3 and 4 vibrate more strongly than the other portions. It should be noted that when the magnitude of the vector Vz is greater than or equal to a predetermined value (>0), and the direction of the vector Vz is the same as the negative direction of the Z-axis, the frequencies of the vibrators 107 and 117 may be set to 240 Hz.

Further, as shown in FIG. 17, when the vector Ve is parallel to the X-axis, i.e., the difference in Z-coordinate value between the vibration object VS and the player character P is "0," the frequencies of the vibrators 107 and 117 is set to a middle value (a value that is higher than 240 Hz and lower than 330 Hz, e.g., 280 Hz). It should be noted that when the magnitude (i.e., the difference in Z-coordinate value between the vibration object VS and the player character P) of the vector Vz is smaller than a predetermined value, the frequencies of the vibrators 107 and 117 may be set within the range of 330 to 240 Hz according to the magnitude of the vector Vz.

Referring back to FIG. 15, the setting of the vibration strengths (amplitudes) of the vibrators 107 and 117 will be described. The vibration strengths of the vibrators 107 and 117 are set based on the magnitude of the vector Ve (the distance between the player character P and the vibration object VS) and the direction of the vector Ve. Initially, a "reference vibration strength (amplitude)" of the vibrators 107 and 117 is calculated based on the distance between the player character P and the vibration object VS.

For example, the "reference vibration strength" is determined within the range of 0 to 1, based on the distance between the player character P and the vibration object VS. The reference vibration strength increases with a decrease in that distance. For example, the reference vibration strength may decrease in a manner represented by a linear function as the distance increases. Alternatively, the reference vibration strength may be inversely proportional to the distance. Alternatively, the reference vibration strength may be fixed in a case where the distance is within a predetermined range, and may decrease with an increase in the distance in a case where the distance is greater than or equal to a predetermined distance. The relationship between the distance and the reference vibration strength may be determined based on any other suitable functions.

After the "reference vibration strength" has been determined, the ratio of the vibration strengths of the vibrators 107 and 117 is determined. As shown in FIG. 15, in the virtual space, reference points L and R are set on a straight line that passes through the location of the player character P and extends parallel to the X-axis. An angle θL between a vector pointing from the location of the player character P toward the reference point L, and the vector Ve, is calculated. Based on the angle θL, a damping coefficient CL is calculated. The damping coefficient CL is calculated within the range of, for example, 0 to 1. For example, the damping coefficient CL is set to "1" in a case where the angle θL is within the range of 0° to 90°, and is set to be smaller than "1" in a case where the angle θL exceeds 90°. The damping coefficient CL may be set to "0" in a case where the angle θL is 180°. Further, for example, as the angle θL changes from 0° to 180°, the damping coefficient CL may linearly change from 1 to 0. By multiplying the "reference vibration strength" determined according to the distance between the player character P and the vibration object VS by the damping coefficient CL calculated based on the angle θL, the vibration strength (amplitude) of the vibrator 107 is determined.

The same applies to the vibrator 117 of the right controller 4. The vibration strength of the vibrator 117 of the right controller 4 is determined based on an angle θR between a vector pointing from the location of the player character P toward the reference point R, and the vector Ve. Specifically, by calculating a damping coefficient CR (e.g., within the range of 0 to 1) based on the angle θR, and multiplying the "reference vibration strength" determined according to the distance between the player character P and the vibration object VS by the damping coefficient CR, the vibration strength (amplitude) of the vibrator 117 is determined.

For example, when the angle θL is equal to the angle θR (i.e., both are 90°), the vibrators 107 and 117 vibrate with the same strength. Further, when the angle θL is smaller than 90° and the angle θR is greater than 90°, the vibrator 107 vibrates more strongly than the vibrator 117.

It should be noted that, in the game according to the second example, it is assumed that the virtual camera is fixed in the virtual space. Alternatively, the location and orientation of the virtual camera may be changed according to an operation performed by the player, or may be automatically changed by a program. In this case, the angles θL and θR may be changed according to the orientation of the virtual camera. For example, in a case where a camera coordinate system may be set for the virtual camera, and the Xc axis of the camera coordinate system is set as the rightward direction of the virtual camera, the reference points L and R may be set on a straight line that passes through the location of the player character P and extends parallel to the Xc axis. The angles θL and θR may be calculated based on the reference points L and R, and the vibration strengths of the vibrators 107 and 117 may be calculated.

A first vibration control signal containing the frequency and vibration strength (amplitude) of the vibrator 107 thus calculated is generated and output to the left controller 3. Similarly, a second vibration control signal containing the frequency and vibration strength (amplitude) of the vibrator 117 thus calculated is generated and output to the right controller 4.

The first and second vibration control signals are generated and output to the left and right controllers 3 and 4, respectively, at predetermined time intervals (e.g., intervals of 5 msec). As a result, the vibrators 107 and 117 vibrate at frequencies and amplitudes corresponding to the positional relationship between the player character P and the vibration object VS.

As described above, in the second example, the frequencies of the vibrators 107 and 117 are set according to the location in the Z-axis direction of the player character P on the XZ plane. When the vibration object VS is located above the player character P (in the positive direction of the Z-axis), the upper portions of the left and right controllers 3 and 4 vibrate strongly. Further, the amplitudes of the vibrators 107 and 117 are set according to the location in the X-axis direction of the player character P on the XZ plane. When the vibration object VS is located to the right of the player character P (in the positive direction of the X-axis), the right controller 4 vibrates more strongly. When the vibration object VS is located to the left of the player character P (in the negative direction of the X-axis), the left controller 3 vibrates more strongly.

By thus setting the frequencies and amplitudes of the left and right vibrators 107 and 117, the player is allowed to recognize whether the vibration object VS is located above, below, to the left of, or to the right of the player character P, based on what portions of the left and right controllers 3 and 4 are vibrating strongly.

For example, when the left controller 3 is vibrating more strongly than the right controller 4, and the upper portion of the left controller 3 is vibrating more strongly than the other portion of the left controller 3, the player can recognize that the vibration object VS is present in an upper left direction (in the negative direction of the X-axis and in the positive direction of the Z-axis) of the player character P. Further, when the left controller 3 vibrates more strongly than the right controller 4, and the lower portion of the left controller 3 is vibrating more strongly than the other portion of the left controller 3, the player can recognize that the vibration object VS is present in a lower left direction (in the negative direction of the X-axis and in the negative direction of the Z-axis) of the player character P.

Further, based on a change in the frequencies of the left and right controllers 3 and 4, the player can estmate the location in the vertical direction (the Z-axis direction) of the vibration object VS.

(Details of Processes)

Next, the processes of the first and second examples will be described in detail. The first example will be firstly described. Afterwards, a description of the second example will be provided.

(Details of Process of First Example)

FIG. 18 is a diagram showing an example of data stored in the main body apparatus 2 in the first example. As shown in FIG. 18, the main body apparatus 2 stores a program D101, operation data D102, list data D103, cursor location data D104, and a vibration control signal D105. It should be noted that the main body apparatus 2 stores other data and programs in addition to those shown in FIG. 18.

The program D101 is for executing the above item selection process of the first example.

The operation data D102 corresponds to operations performed on the left and right controllers 3 and 4, and is transmitted from the left and right controllers 3 and 4. In the exemplary embodiment, the main body apparatus 2 communicates with the left and right controllers 3 and 4 at predetermined time intervals (e.g., intervals of $1/200$ sec). In the communication, the left and right controllers 3 and 4 transmit the operation data D102 to the main body apparatus 2. Further, in the communication, the vibration control signal D105 is transmitted from the main body apparatus 2 to the left controller 3 or the right controller 4.

The list data D103 indicates the number of items to be selected and each item. For example, in a case where the list contains items 1 to 20, the list data D103 includes "20" as the number of items to be selected, and data indicating each of the items 1 to 20. Each item is assigned a numerical value (1 to 20) indicating a location in the list.

The cursor location data D104 indicates a location in the list of the cursor 350. For example, in a case where the list contains items 1 to 20, one of the numerical values "1" to "20" is stored as the cursor location data D104.

The vibration control signal D105 is data for causing the vibrator 107 of the left controller 3 or the vibrator 117 of the right controller 4 to vibrate, and contains a frequency and an amplitude.

Next, the selection process of the first example will be described in detail.

Figure 19:
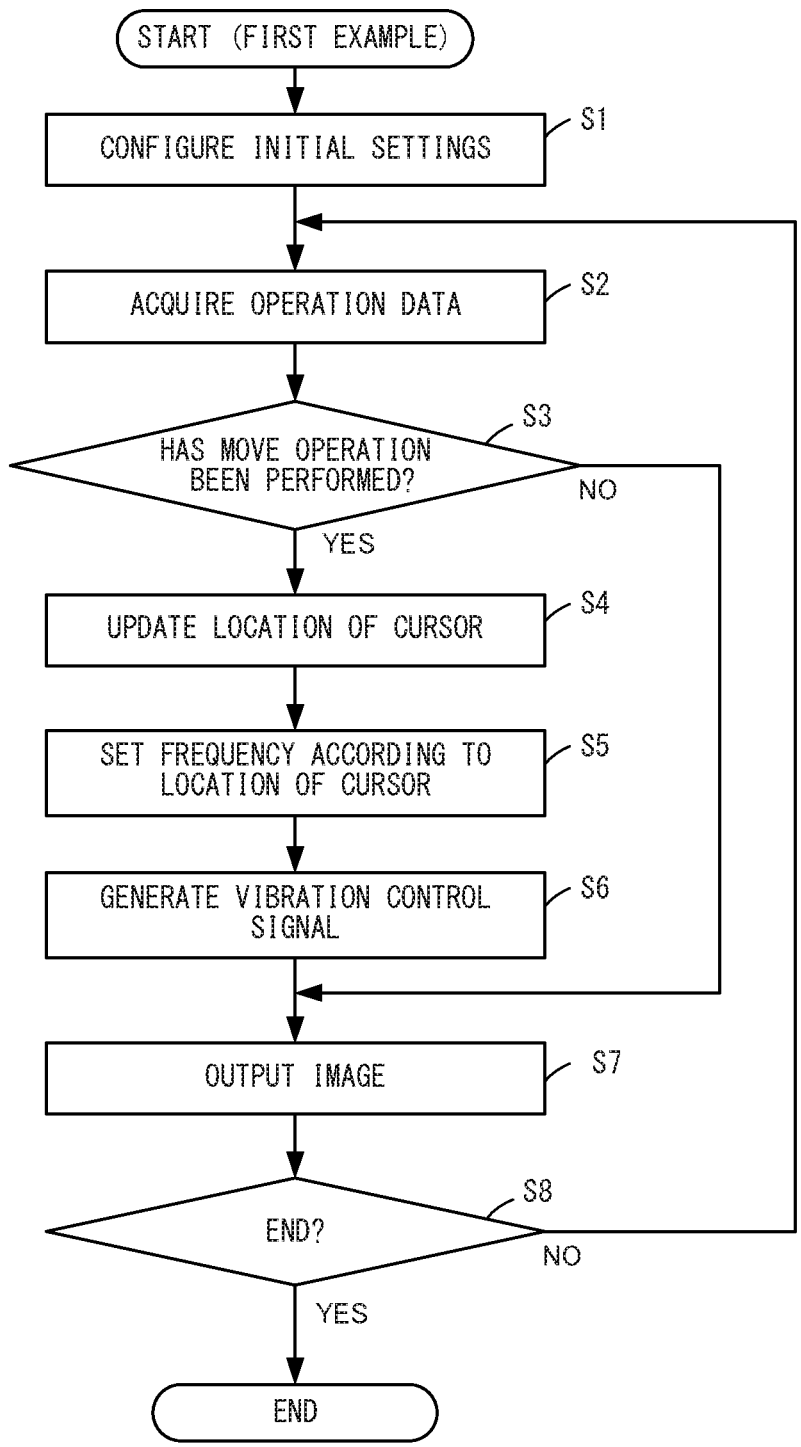
FIG. 19 is an example non-limiting flowchart showing details of a process performed in a main body apparatus 2 when a selection process of the first example is executed.

FIG. 19 is a flowchart showing details of a process performed in the main body apparatus 2 when the selection process of the first example is executed. The process shown in FIG. 19 is performed by the processor 81 of the main body apparatus 2 executing the program D101 (information processing program). In the description that follows, it is assumed that the selection process is performed g the left controller 3. A similar selection process is similarly performed when the right controller 4 is used.

As shown in FIG. 19, the processor 81 of the main body apparatus 2 (hereinafter simply referred to as "the main body apparatus 2") initially configures initial settings (step S1). Specifically, the main body apparatus 2 initially sets and stores the number of items to be selected and each item, as the list data D103, in the DRAM 85. For example, the main body apparatus 2 sets the number of items to be selected to "20," and sets an "item 1" to an "item 20" as the items of the list. Further, the main body apparatus 2 sets the location of the cursor 350 to the top (the item 1) of the list. Further, the main body apparatus 2 sets a display range (items are to be displayed). After step S1, the main body apparatus 2 repeatedly executes steps S2 to S8 at intervals of, for example, $1/60$ sec (called a one-frame time).

Following step S1, the main body apparatus 2 acquires operation data transmitted from the left controller 3 (step S2). Specifically, the left controller 3 transmits operation data corresponding to an operation to the main body apparatus 2 at predetermined time intervals (e.g., intervals of $1/200$ sec). The main body apparatus 2 temporarily stores the operation data received from the left controller 3 in the DRAM 85. In step S2, the main body apparatus 2 acquires the operation data stored in the DRAM 85.

Next, the main body apparatus 2 determines whether or not an operation of moving the cursor 350 has been performed, based on the acquired operation data (step S3). For example, when "up" or "down" has been input using the stick 32 of the left controller 3, the main body apparatus 2 determines that an operation of moving the cursor 350 has been performed.

If the main body apparatus 2 determines that an operation of moving the cursor 350 has been performed (step S3: YES), the main body apparatus 2 updates the location of the cursor 350 (step S4). For example, if "down" has been input using the stick 32, the main body apparatus 2 updates the cursor location data D104 by adding "1" to the current location of the cursor 350. Further, for example, if "up" has been input using the stick 32, the main body apparatus 2 updates the cursor location data D104 by subtracting "1" from the current location of the cursor 350. It should be noted that if the value indicating the current location of the cursor 350 is "20," then when "down" is input using the stick 32, the cursor location data D104 is not updated. Further, if the value indicating the current location of the cursor 350 is "1," then when "up" is input using the stick 32, the cursor location data D104 is not updated.

Following step S4, the main body apparatus 2 sets the frequency of the vibrator 107, based on the location of the cursor 350 updated in step S4 (step S5). For example, if the updated location of the cursor 350 is within "1" to "3," the main body apparatus 2 sets the frequency of the vibrator 107 to a high value (e.g., 330 Hz). Further, if the updated location of the cursor 350 is within "4" to "19," the main body apparatus 2 sets the frequency of the vibrator 107 to a middle value (e.g., a value of lower than 330 Hz and higher than 240 Hz). For example, the frequency of the vibrator 107 may be decreased by "5 Hz" each time the value indicating the location of the cursor 350 increases by "1." Further, if the updated location of the cursor 350 is "20," the main body apparatus 2 sets the frequency of the vibrator 107 to a low value (e.g., 240 Hz).

Next, the main body apparatus 2 generates a vibration control signal that is to be output to the left controller 3 (step S6). Specifically, the main body apparatus 2 generates and stores a vibration control signal containing the frequency of the vibrator 107 set in step S5, as the vibration control signal D105. The vibration control signal D105 is output from the main body apparatus 2 to the left controller 3 in communication between the main body apparatus 2 and the left controller 3.

It should be noted that if the location of the cursor 350 has not updated in step S4, the vibration control signal may not be generated in step S6. That is, if the location of the cursor 350 has not been changed, and the cursor 350 has continued to point a specific item for a predetermined period of time, the vibration control signal may not be generated.

Following step S6, the main body apparatus 2 sets a display range, generates an image containing a plurality of items included within the set display range and the cursor 350, and outputs the generated image to the display 12 (step S7).

Following step S7, the main body apparatus 2 determines whether or not to end the process of FIG. 19 (step S8). For example, if the user has performed an operation of determining an item (e.g., pressing down the ZL-button 39), the main body apparatus 2 determines the item pointed by the cursor 350, and ends the process of FIG. 19. If the main body apparatus 2 determines not to end the process of FIG. 19, the main body apparatus 2 executes step S2 again. The description of FIG. 19 is ended.

It should be noted that the process of FIG. 19 is merely illustrative. For example, the steps may be executed in a different order, other steps may be added, or a portion of the steps may be removed. Further, the numerical values used in the process are merely illustrative. Other values may be used.

(Details of Process of Second Example)

Figure 20:
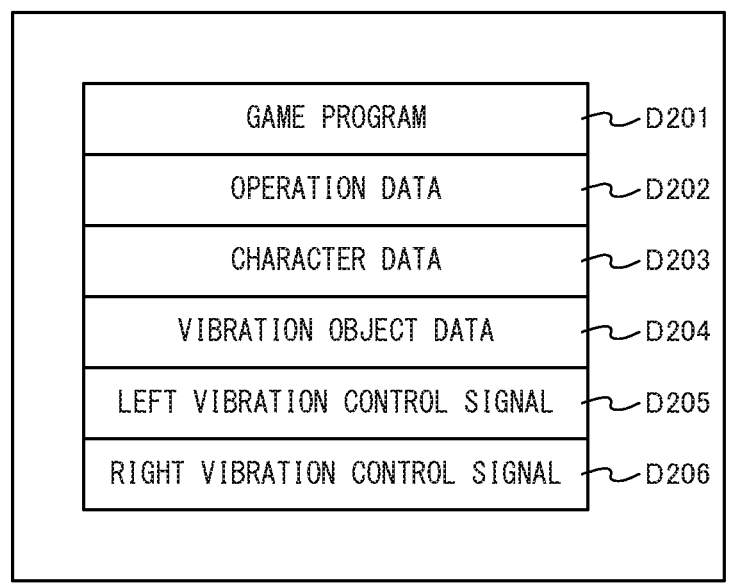
FIG. 20 is an example non-limiting diagram showing an example of data stored in a main body apparatus 2 when a game according to a second example is performed.

Next, a process that is performed in the game according to the second example will be described in detail. FIG. 20 is a diagram showing an example of data stored in the main body apparatus 2 when the game according to the second example is performed.

As shown in FIG. 20, the main body apparatus 2 stores a game program D201, operation data D202, character data D203, vibration object data D204, a left vibration control signal D205, and a right vibration control signal D206. It should be noted that the main body apparatus 2 stores various other data and programs in addition to those shown in FIG. 20.

The game program D201 is for executing the game according to the second example.

The operation data D202 corresponds to operations performed on the left and right controllers 3 and 4, and is transmitted from the left and right controllers 3 and 4. In the exemplary embodiment, the main body apparatus 2 communicates with the left and right controllers 3 and 4 at predetermined time intervals (e.g., intervals of 1/200 sec). In the communication, the left and right controllers 3 and 4 transmit the operation data D202 to the main body apparatus 2. Further, in the communication, the left and right vibration control signals D205 and D206 are transmitted from the main body apparatus 2 to the left and right controllers 3 and 4, respectively.

The character data D203 contains information related to the location, orientation, movement speed, movement direction, etc., of the player character P.

The vibration object data D204 contains information related to the location of the vibration object VS in the virtual space.

The left vibration control signal D205 is data indicating the first vibration control signal for causing the vibrator 107 of the left controller 3 to vibrate, and contains a frequency and an amplitude. The right vibration control signal D206 is data indicating the second vibration control signal for causing the vibrator 117 of the right controller 4 to vibrate, and contains a frequency and an amplitude.

Next, the game according to the second example process will be described in detail.

Figure 21:
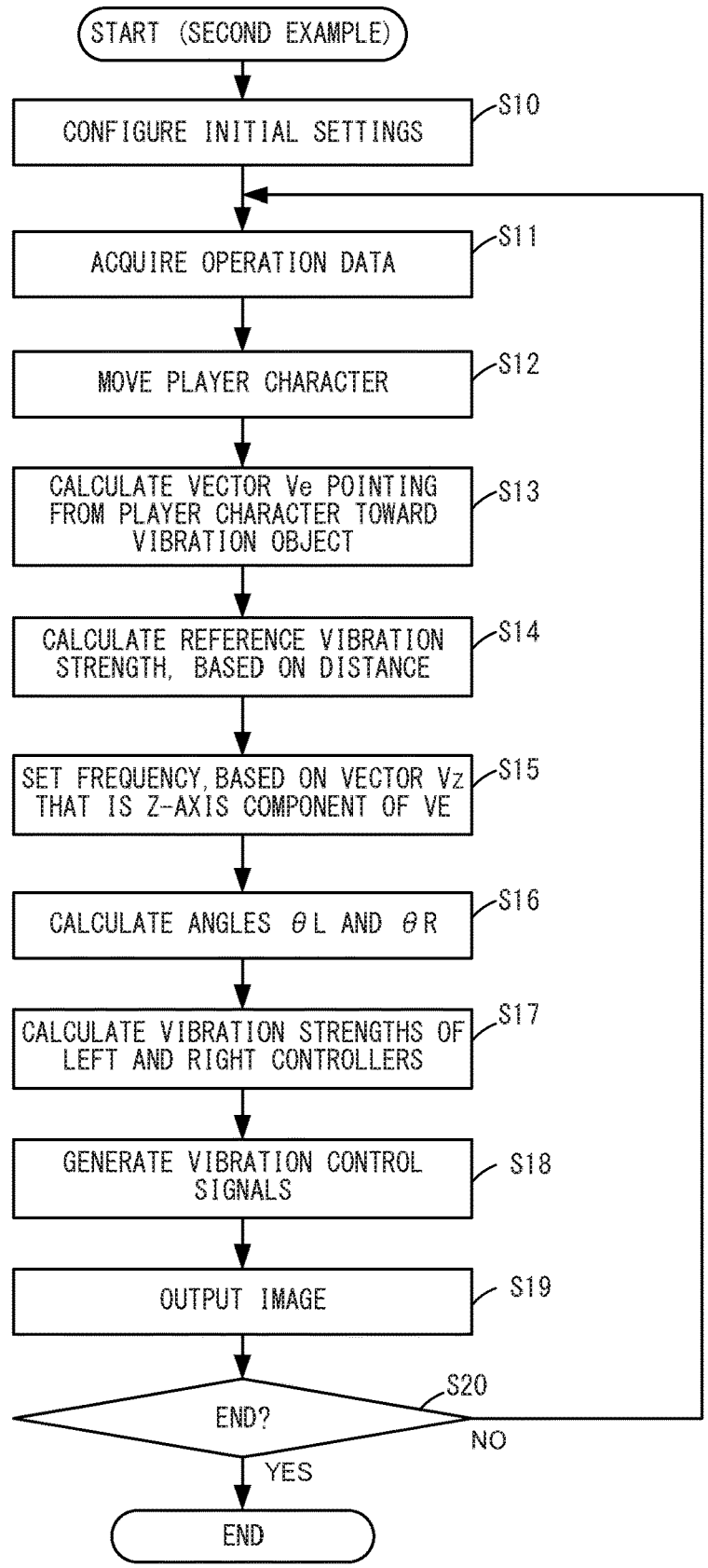
FIG. 21 is an example non-limiting flowchart showing details of a process performed in a main body apparatus 2 when a game according to the second example is executed.

FIG. 21 is a flowchart showing details of a process performed in the main body apparatus 2 when the game according to the second example is executed. The process of FIG. 21 is performed by the processor 81 of the main body apparatus 2 executing the game program D201 (information processing program).

As shown in FIG. 21, initially, the processor 81 of the main body apparatus 2 (hereinafter simply referred to as "the main body apparatus 2") configures initial settings (step S10). Specifically, the main body apparatus 2 sets the virtual space, and provides the vibration object VS and the player character P in the virtual space. Further, the main body apparatus 2 sets the virtual camera in the virtual space at a predetermined location. After step S10, the main body apparatus 2 repeatedly executes steps S11 to S20 at intervals of, for example, 1/60 sec (called a one-frame time).

Following step S10, the main body apparatus 2 acquires operation data transmitted from the left and right controllers 3 and 4 (step S11).

Next, the main body apparatus 2 causes the player character P to perform a motion in the virtual space, based on the acquired operation data (step S12). For example, when the stick 32 of the left controller 3 is operated, the main body apparatus 2 causes the player character P to move in the virtual space in a direction corresponding to the operation direction of the stick 32, and updates the location and orientation of the player character P. The main body apparatus 2 stores the updated location and orientation of the player character P as the character data D203.

Following step S12, the main body apparatus 2 calculates the vector Ve pointing from the player character P toward the vibration object VS (step S13). Next, the main body apparatus 2 calculates the distance between the player character P and the vibration object VS (the magnitude of the vector Ve), and based on the distance, calculates the reference vibration strength (step S14).

Next, the main body apparatus 2 sets the frequencies of the vibrators 107 and 117, based on the vector Vz that is the Z-axis component of the vector Ve (step S15). For example, when the vector Vz that is the Z-axis component points in the positive direction of the Z-axis, the main body apparatus 2 sets the frequencies of the vibrators 107 and 117 to a relatively high value (e.g., 330 Hz). Further, for example, when the vector Vz that is the Z-axis component points in the negative direction of the Z-axis, the main body apparatus 2 sets the frequencies of the vibrators 107 and 117 to a relatively low value (e.g., 240 Hz). It should be noted that when the magnitude of the vector Vz (the difference in Z-coordinate value between the player character P and the vibration object VS) is smaller than a predetermined value, the main body apparatus 2 may set the frequencies of the vibrators 107 and 117 within the range of 330 to 240 Hz according to the magnitude of the vector Vz.

Following step S15, the main body apparatus 2 calculates the angles θL and θR (step S16). Specifically, the main body apparatus 2 calculates the angle θL between a vector pointing in the negative direction of the X-axis of the virtual space and the vector Ve. Further, the main body apparatus 2 calculates the angle θR between a vector pointing in the positive direction of the X-axis of the virtual space and the vector Ve.

Next, the main body apparatus 2 calculates the vibration strengths of the left and right controllers 3 and 4 (step S17).

Specifically, the main body apparatus 2 calculates the amplitude of the vibrator 107 of the left controller 3, based on the reference vibration strength calculated in step S14 and the angle θL calculated in step S16. Further, the main body apparatus 2 calculates the amplitude of the vibrator 117 of the right controller 4, based on the reference vibration strength calculated in step S14 and the angle θR calculated in step S16.

Next, the main body apparatus 2 generates vibration control signals that are to be output to the left and right controllers 3 and 4 (step S18). Specifically, the main body apparatus 2 generates a first vibration control signal containing the frequency set in step S15 and the amplitude of the vibrator 107 calculated in step S17, and stores the first vibration control signal as the left vibration control signal D205. Further, the main body apparatus 2 generates a second vibration control signal containing the frequency set in step S15 and the amplitude of the vibrator 117 calculated in step S17, and stores the second vibration control signal as the right vibration control signal D206. The left and right vibration control signals D205 and D206 are output from the main body apparatus 2 to the left and right controllers 3 and 4, respectively, in communication between the main body apparatus 2 and the controllers (3 and 4).

If step S18 has been performed, the main body apparatus 2 generates an image of the virtual space using the virtual camera, and outputs the generated image to the display 12 (step S19).

Following step S19, the main body apparatus 2 determines whether or not to end the process of FIG. 21 (step S20). For example, if the location of the vibration object VS coincides with the location of the player character P, then when the player performs a specific operation, the main body apparatus 2 displays an image indicating that the player character P has acquired a predetermined item, and ends the process of FIG. 21. If, in step S20, the main body apparatus 2 determines not to end the process of FIG. 21, the main body apparatus 2 executes step S11 again.

It should be noted that the process of FIG. 21 is merely illustrative. For example, the steps may be executed in a different order, other steps may be added, or a portion of the steps may be removed. Further, the numerical values used in the steps are merely illustrative. Other values may be used.

As described above, in the controller of the exemplary embodiment, when the vibrator vibrates at a first frequency (e.g., 330 Hz), a first portion (upper portion) of the controller vibrates more strongly than the other portion, and when the vibrator vibrates at a second frequency (e.g., 240 Hz), a second portion (lower portion) of the controller vibrates more strongly than the other portion.

In the first example, the controller having such properties is used such that the frequency of the vibrator is set according to the location in the list of an operation object (the cursor 350) operated by the user. List items are arranged in the vertical direction. For example, when the cursor 350 points an upper portion (around the top) of the list, the vibrator is caused to vibrate at a first frequency (e.g., 330 Hz), and therefore, an upper portion of the controller vibrates strongly. Further, when the cursor 350 points a lower portion (around the bottom) of the list, the vibrator is caused to vibrate at a second frequency (e.g., 240 Hz), and therefore, a lower portion of the controller vibrates strongly. As a result, the user can recognize or identify the location in the list of a currently selected item, based on which of the upper and lower portions of the controller vibrates strongly.

Further, the vibrator vibrates at a frequency that varies according to the location in the list of a currently selected item. Therefore, the user can recognize or identify the location in the list of a currently selected item, by feeling a difference in frequency.

Further, in the game according to the second example, the frequencies and amplitudes of the vibrators 107 and 117 are set according to the positional relationship between the player character P and the vibration object VS. Specifically, the frequencies of the vibrators 107 and 117 are set according to the positional relationship in the Z-axis direction (vertical direction) between the player character P and the vibration object VS (step S15). Further, the ratio of the amplitudes of the vibrators 107 and 117 is set according to the positional relationship in the X-axis direction (horizontal direction) between the player character P and the vibration object VS.

The frequencies and amplitudes of the two controllers are set in the above manner. Therefore, the user can recognize or identify the location on a two-dimensional plane of the vibration object VS, based on what portions of the two controllers are vibrating strongly.

(Variations)

In the foregoing, the exemplary embodiment has been described. In other exemplary embodiments, the following features may be provided.

For example, in the first example, it is assumed that when the cursor 350 is moved, the vibrator vibrates, and when the cursor 350 is not moved, the vibrator does not vibrate. Alternatively, the vibrator may vibrate no matter whether or not the cursor 350 is moved. In this case, the frequency of the vibrator is set according to the location in the list of an item pointed by the cursor 350. The vibrator may continue to vibrate at the frequency thus set while the cursor 350 is pointing the same item.

Further, in the first example, it is assumed that the vibrator vibrates after the cursor 350 has been moved to select an item and before the selected item has been accepted or confirmed. That is, the user performs a selection operation of selecting one of a plurality of items in the list (an operation of moving the cursor 350), and the vibrator is caused to vibrate after the selection operation has been performed, assuming that a determination operation of accepting or confirming the selected item (an operation of pressing down the ZL-button 39) will be inevitably performed. In another exemplary embodiment, the vibration may occur when the determination operation is performed. In this case, the vibrator vibrates at the first or second frequency according to the location in the list of an item accepted or confirmed by the user.

Further, in the first example, it is assumed that when the cursor 350 is located between the first location and the second location, the frequency of the vibrator is linearly changed according to the location in the list of an item pointed by the cursor 350. The relationship between the location of the cursor 350 and the frequency of the vibrator is not limited to this. The frequency of the vibrator may be set according to any suitable function that takes a value according to the location in the list of an item pointed by the cursor 350.

Further, in the first example, it is assumed that the cursor 350 is displayed. The cursor 350 may not be inevitably displayed. In this case, in the main body apparatus 2, the location in the list of a currently selected item is internally managed, and is changed according to the user's operation. That is, an operation object that is or is not displayed is controlled according to the user's operation. The operation object indicates the location in the list of a currently selected item, and the frequency of the vibrator may be set according to the location in the list of a currently selected item that is indicated by the operation object.

Further, in the second example, it is assumed that the frequency of vibration of the vibrator is set according to the relative positional relationship between the player character P and the vibration object VS fixed in the virtual space. In another exemplary embodiment, the vibration object VS may be movable in the virtual space. That is, in another exemplary embodiment, the frequency of vibration of the vibrator may be set according to a positional relationship between the operation object and a predetermined location in the virtual space (that location may be invariable or variable).

Further, in the second example, the left and right controllers 3 and 4 are held in the portrait orientation, the vibration strengths of the left and right controllers 3 and 4 are changed according to the positional relationship in the X-axis direction between the player character P and the vibration object VS, and the frequencies of the left and right controllers 3 and 4 are changed according to the positional relationship in the Z-axis direction between the player character P and the vibration object VS. In another exemplary embodiment, for example, the left controller 3 may be held in the portrait position, the right controller 4 may be held in the landscape orientation, the frequency of the vibrator 107 of the left controller 3 may be changed according to the positional relationship in the Z-axis direction between the player character P and the vibration object VS, and the frequency of the vibrator 117 of the right controller 4 may be changed according to the positional relationship in the X-axis direction between the player character P and the vibration object VS.

Further, the cursor in the first example and the player character P in the second example are merely illustrative operation objects. Operation objects that are operated by the user are not limited to these examples.

That is, assuming that an operation device (the controller 3, 4) is provided in which when a vibrator (the vibrator 107, 117) vibrates at a first frequency, a first portion vibrates strongly, and when the vibrator vibrates at a second frequency, a second portion vibrates strongly, any suitable operation object may be controlled. The location of the operation object (the location in a list of a cursor, the location on a two-dimensional plane of a player character, etc.) is controlled within a predetermined range according to the user's operation performed on the operation device. When the operation object is located at a first location within the predetermined range, the vibrator may be caused to vibrate at the first frequency, and when the operation object is located at a second location, the vibrator may be caused to vibrate at the second frequency.

Further, in the above exemplary embodiment, it is assumed that the frequency and amplitude of a vibrator are set according to the location of an operation object. In another exemplary embodiment, vibration pattern data indicating a vibration waveform may be previously stored, and the frequency and amplitude of a vibrator may be set by adjusting a frequency and an amplitude that are based on the vibration pattern data, according to the location of an operation object. For example, vibration pattern data corresponding to a vibration object is previously stored, and the vibration pattern data contains a frequency and an amplitude at each moment. The main body apparatus 2 reads a frequency and an amplitude from the vibration pattern data, and adjusts the read frequency and amplitude according to the location of the operation object.

Further, in the above exemplary embodiment, when the operation object is located between the first location and the second location, the vibrator is caused to vibrate at a middle frequency between the first frequency and the second frequency, that varies according to the location of the operation object. In another exemplary embodiment, when the operation object is located between the first location and the second location, the vibrator may be caused to vibrate at one of the first frequency and the second frequency, according to the location of the operation object. For example, when the operation object is located closer to the first location than the second location, the vibrator may be caused to vibrate at the first frequency, and when the operation object is located closer to the second location than the first location, the vibrator may be caused to vibrate at the second frequency. For example, in the first example, when the cursor 350 is located at the items 1 to 10, the vibrator may be caused to vibrate at the first frequency, and when the cursor 350 is located at the items 11 to 20, the vibrator may be caused to vibrate at the second frequency. Further, in the second example, when the vector Vz that is the Z-axis component of the vector Ve is a zero vector or points in the positive direction of the Z-axis (the case of FIG. 15 or 17), the vibrator may be caused to vibrate at the first frequency, and when the vector Vz that is the Z-axis component of the vector Ve points in the negative direction of the Z-axis (the case of FIG. 16), the vibrator may be caused to vibrate at the second frequency.

Further, assuming that the operation device is configured such that when the vibrator vibrates at the first frequency, the first portion vibrates strongly, and when the vibrator vibrates at the second frequency, the second portion vibrates strongly, the vibrator may be caused to vibrate at the first frequency or the second frequency, based on a predetermined information process. The predetermined information process is not limited to the control of the location of an operation object, and may be other processes.

Further, in the above exemplary embodiment, it is assumed that the main body apparatus 2 sets a frequency and an amplitude, and generates and transmits a vibration control signal containing the frequency and the amplitude to a single controller. Specifically, the first frequency (e.g., 330 Hz) or the second frequency (e.g., 240 Hz) is selected according to the location of the operation object, and a vibration control signal containing the selected frequency and an amplitude to a single controller. In another exemplary embodiment, a first signal containing the first frequency and a second signal containing the second frequency may be generated, and the two signals may be transmitted to a single controller. In this case, the first and second signals each contain a value indicating an amplitude. The value of an amplitude contained in each of the first and second signals may be changed according to the location of the operation object within a predetermined range. That is, the vibrator may be caused to vibrate such that the ratio of the vibration strengths at the first and second frequencies is changed according to the location of the operation object. The vibrator is configured to receive the two signals, and produce a combined vibration based on the signals.

For example, when the vibrator is caused to vibrate at the first frequency, the first signal containing the first frequency and an amplitude having a value of "1" may be transmitted to the controller, and the second signal containing the second frequency and an amplitude having a value of "0" may be transmitted to the controller. In this case, a vibration based on the first signal is performed, and a vibration based on the second signal is not performed. Further, when the vibrator is caused to vibrate at a middle frequency between the first frequency and the second frequency, the first signal containing the first frequency and an amplitude having a value of "0.5" may be transmitted to the controller, and the second signal containing the second frequency and an amplitude having a value of "0.5" may be transmitted to the controller. In this case, performed is a vibration based on a combined waveform of a vibration waveform based on the first signal and a vibration waveform based on the second signal. Further, when the vibrator is caused to vibrate at the second frequency, the first signal containing the first frequency and an amplitude having a value of "0" may be transmitted to the controller, and the second signal containing the second frequency and an amplitude having a value of "1" may be transmitted to the controller. In this case, a vibration based on the second signal is performed, and a vibration based on the first signal is not performed.

Further, it may not be assumed that the operation device is configured such that when the vibrator vibrates at the first frequency, the first portion vibrates strongly, and when the vibrator vibrates at the second frequency, the second portion vibrates strongly. For example, an operation device is provided with a vibrator that vibrates at a specified frequency. The location of an operation object (a cursor, a player character, or any other suitable virtual operation objects) within a predetermined range is controlled according to an operation performed on the operation device. In this case, the vibrator may be caused to vibrate at a frequency corresponding to the location of the operation object. As a result, the user can recognize or identify the location of the operation object by feeling a difference in frequency.

Further, in the above exemplary embodiment, it is assumed that two controllers (3 and 4) are caused to vibrate. Alternatively, one or at least three controllers may be caused to vibrate.

Further, in the above exemplary embodiment, it is assumed that the left and right controllers 3 and 4 are attachable and detachable to and from the main body apparatus 2. In another exemplary embodiment, the left and right controllers 3 and 4 may be integrated with the main body apparatus 2 so that the left and right controllers 3 and 4 are not detachable from the main body apparatus 2.

Further, an operation device in which the left and right controllers 3 and 4 are integrated together may be used. In this case, the operation device may have a left portion and a right portion. A vibrator may be provided in the left portion, and another vibrator may be provided in the right portion. The two vibrators may be caused to vibrate. Alternatively, a single vibrator may be provided in an operation device, and may be caused to vibrate.

Further, in the above exemplary embodiment, it is assumed that the main body apparatus 2 functions as the location controller 200 and the vibration controller 201. In another exemplary embodiment, the left and right controllers 3 and 4 may function as the vibration controller 201. For example, the left and right controllers 3 and 4 may generate vibration control signals for causing the vibrators 107 and 117 to vibrate, in accordance with a command from the main body apparatus 2, and output the vibration control signals to the vibrators 107 and 117.

Further, the above information process may be performed in an information processing system in which a plurality of devices are connected together via a network (e.g., the Internet or a LAN). For example, a terminal and a server may be connected together via the Internet to constitute the above system. In this case, for example, the terminal may be provided with operation devices that are counterparts of the left and right controllers 3 and 4, and a display device, and the server may be provided with the location controller 200 and the vibration signal generator 201. The terminal transmits operation data corresponding to an operation performed on the operation device by a player to the server. The server controls an operation object (a cursor, a player character, etc.), based on the operation data, and generates a vibration control signal according to the location of the operation object within a predetermined range. The terminal receives the vibration control signal, and causes the operation device to vibrate.

Further, the above information process may be performed in other systems (or devices), such as a personal computer, a smartphone, a tablet terminal, etc.

In the foregoing, the exemplary embodiment has been described. The above description of the exemplary embodiment is merely illustrative. Various modifications and changes may be made thereto.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
   an operation device including a vibrator configured to vibrate at specified frequencies; and
   at least one processor configured to at least:
   control a location of an operation object within a range, based on an operation performed on the operation device; and
   control a vibration of the vibrator,
   wherein when the at least one processor controls the vibrator to vibrate at a first frequency, a first portion on a first side of the operation device is caused to vibrate more strongly than a second portion on a second side of the operation device, and
   wherein when the at least one processor controls the vibrator to vibrate at a second frequency different from the first frequency, the second portion of the operation device different from the first portion is caused to vibrate more strongly than the first portion of the operation device, the first and second sides being different from one another, and
   wherein based on an information process, the at least one processor is further configured to cause the vibrator to vibrate at (a) the first frequency when the operation object is located at a first location, (b) the second frequency when the operation object is located at a second location remote from the first location, and (c) a third frequency between the first and second frequencies corresponding to a position of the operation object intermediate the first and second locations.

2. The information processing system according to claim 1, wherein when the vibrator is caused to vibrate at the first frequency, the first portion is caused to vibrate more strongly than the second portion, due to resonance.

3. The information processing system according to claim 1, wherein the second portion is closer to the vibrator than the first portion is.

4. The information processing system according to claim 1, wherein when the operation object is located between the first location and the second location, the at least one processor is configured to cause the vibrator to vibrate at the first frequency or the second frequency, according to the location of the operation object.

5. The information processing system according to claim 1, wherein the at least one processor is further configured to:
enable generation of a first vibration signal containing the first frequency and a first strength, and a second vibration signal containing the second frequency and a second strength, and output the first and second vibration signals to the operation device, and
determine, when the operation object is located between the first location and the second location, the first strength contained in the first vibration signal, and the second strength contained in the second vibration signal, according to the location of the operation object, and output the first and second vibration signals containing the determined strengths to the operation device.

6. The information processing system according to claim 1, wherein:
the range is a virtual space,
the operation object is a player character, and
the at least one processor is further configured to cause the vibrator to vibrate according to a relative positional relationship between a location in the virtual space and the player character.

7. The information processing system according to claim 1, wherein the first portion is proximate to a first end of the operation device and the second portion is proximate to a second end of the operation device.

8. The information processing system according to claim 1, wherein the operation device, and components thereof, are sized, shaped, and weighted to respond to the first frequency by causing the operation device to vibrate strongly at the first portion and respond to the second frequency by causing the operation device to vibrate strongly at the second portion, the first portion being farther from the vibrator compared to the second portion.

9. The information processing system according to claim 8, wherein the first frequency is higher than the second frequency.

10. The information processing system according to claim 8, wherein an entire housing of the operation device vibrates when the vibrator is vibrated with the first frequency.

11. The information processing system according to claim 1, wherein the operation device, and components thereof, are sized, shaped, and weighted to respond to a first frequency range including the first frequency by causing the operation device to vibrate strongly at the first portion and respond to a second frequency range including the second frequency by causing the operation device to vibrate strongly at the second portion, the first portion being farther from the vibrator compared to the second portion.

12. The information processing system according to claim 11, wherein the first frequency is provided intermediate the first frequency range, and the second frequency is provided intermediate the second frequency range, the first and second frequency ranges being non-overlapping.

13. The information processing system according to claim 12, wherein the first portion vibrates due to resonance and the second portion does not vibrate due to resonance.

14. The information processing system according to claim 1, wherein the first portion vibrates due to resonance and the second portion does not vibrate due to resonance.

15. An information processing system comprising:
an operation device including a vibrator configured to vibrate at a specified frequency;
a vibration controller configured to control a vibration of the vibrator; and
a location controller configured to control a location of an operation object within a range, based on an operation performed on the operation device, wherein:
when the vibrator vibrates at a first frequency, a first portion of the operation device vibrates more strongly than the other portion of the operation device, and when the vibrator vibrates at a second frequency different from the first frequency, a second portion of the operation device different from the first portion vibrates more strongly than the other portion of the operation device,
the vibration controller causes the vibrator to vibrate at the first frequency or the second frequency, based on an information process,
when the operation object is located at a first location, the vibration controller causes the vibrator to vibrate at the first frequency, and when the operation object is located at a second location, the vibration controller causes the vibrator to vibrate at the second frequency,
the range is a range of a list within which selection is allowed,
the operation object indicates a currently selected item in the list, and
the vibration controller causes the vibrator to vibrate according to a location in the list of the currently selected item indicated by the operation object.

16. An information processing system comprising:
an operation device including a vibrator configured to vibrate at a specified frequency;
a location controller configured to control a location of an operation object within a range, based on an operation performed on the operation device; and
a vibration controller configured to control a vibration of the vibrator, wherein:
when the vibrator vibrates at a first frequency, a first portion of the operation device vibrates more strongly than the other portion of the operation device, and when the vibrator vibrates at a second frequency different from the first frequency, a second portion of the operation device different from the first portion vibrates more strongly than the other portion of the operation device, and
the vibration controller causes the vibrator to vibrate at the first frequency or the second frequency, based on an information process,
the range is a virtual space,
the operation object is a player character,
the vibration controller causes the vibrator to vibrate according to a relative positional relationship between a location in the virtual space and the player character,
the operation device includes a first operation device and a second operation device,
the first operation device includes a first vibrator configured to vibrate at a specified frequency,
the second operation device includes a second vibrator configured to vibrate at a specified frequency,
when the first vibrator vibrates at the first frequency, a first portion of the first operation device vibrates more strongly than the other portion of the first operation device, and when the first vibrator vibrates at the second frequency, a second portion of the first operation device different from the first portion vibrates more strongly than the other portion of the first operation device,
when the second vibrator vibrates at the first frequency, a first portion of the second operation device vibrates more strongly than the other portion of the second operation device, and when the second vibrator vibrates at the second frequency, a second portion of the second operation device different from the first portion vibrates more strongly than the other portion of the second operation device, and the vibration controller causes the first vibrator to vibrate at the first frequency or the second frequency, and the second vibrator to vibrate at the first frequency or the second frequency, according to the positional relationship.

17. A non-transitory storage medium having stored therein an information processing program executable by a computer of an information processing apparatus for controlling a vibration of an operation device including a vibrator configured to vibrate at specified frequencies, the program, when executed, causing the computer to at least:
control a location of an operation object within a range, based on an operation performed on the operation device;
control a vibration of the vibrator,
wherein when the vibrator is caused to vibrate at a first frequency, a first portion on a first side of the operation device is caused to vibrate more strongly than a second portion on a second side of the operation device, and
wherein when the vibrator is caused to vibrate at a second frequency different from the first frequency, the second portion of the operation device different from the first portion is caused to vibrate more strongly than the first portion of the operation device, the first and second sides being different from one another, and
wherein based on an information process, the vibrator is caused to vibrate at (a) the first frequency when the operation object is located at a first location, (b) the second frequency when the operation object is located at a second location remote from the first location, and (c) a third frequency between the first and second frequencies corresponding to a position of the operation object intermediate the first and second locations.

18. The non-transitory storage medium according to claim 17, wherein when the operation object is located between the first location and the second location, the vibrator is caused to vibrate at the first frequency or the second frequency, according to the location of the operation object.

19. The non-transitory storage medium according to claim 17, wherein:
a first vibration signal containing the first frequency and a first strength, and a second vibration signal containing the second frequency and a second strength, are generatable and output to the operation device, and
when the operation object is located between the first location and the second location, the first strength contained in the first vibration signal, and the second strength contained in the second vibration signal, are determined according to the location of the operation object, and the first and second vibration signals containing the determined strengths are output to the operation device.

20. The non-transitory storage medium according to claim 17, wherein:
the range is a virtual space,
the operation object is a player character, and
in the vibration control, the vibrator is caused to vibrate according to a relative positional relationship between a location in the virtual space and the player character.

21. A non-transitory storage medium having stored therein an information processing program executable by a computer of an information processing apparatus for controlling a vibration of an operation device including a vibrator configured to vibrate at a specified frequency, the program, when executed, causing the computer to at least:
control a location of an operation object within a range, based on an operation performed on the operation device; and
control a vibration of the vibrator, wherein:
when the vibrator vibrates at a first frequency, a first portion of the operation device vibrates more strongly than the other portion of the operation device, and when the vibrator vibrates at a second frequency different from the first frequency, a second portion of the operation device different from the first portion vibrates more strongly than the other portion of the operation device,
in the vibration control, the vibrator is caused to vibrate at the first frequency or the second frequency, based on an information process,
in the location control, when the operation object is located at a first location, the vibration controller causes the vibrator to vibrate at the first frequency, and when the operation object is located at a second location, the vibration controller causes the vibrator to vibrate at the second frequency,
the range is a range of a list within which selection is allowed,
the operation object indicates a currently selected item in the list, and
in the vibration control, the vibrator is caused to vibrate according to a location in the list of the currently selected item indicated by the operation object.

22. A non-transitory storage medium having stored therein an information processing program executable by a computer of an information processing apparatus for controlling a vibration of an operation device including a vibrator configured to vibrate at a specified frequency, the program, when executed, causing the computer to at least:
control a location of an operation object within a range, based on an operation performed on the operation device; and
control a vibration of the vibrator, wherein:
when the vibrator vibrates at a first frequency, a first portion of the operation device vibrates more strongly than the other portion of the operation device, and when the vibrator vibrates at a second frequency different from the first frequency, a second portion of the operation device different from the first portion vibrates more strongly than the other portion of the operation device, and
in the vibration control, the vibrator is caused to vibrate at the first frequency or the second frequency, based on an information process;
in the location control, when the operation object is located at a first location, the vibration controller causes the vibrator to vibrate at the first frequency, and when the operation object is located at a second location, the vibration controller causes the vibrator to vibrate at the second frequency,
the range is a virtual space,
the operation object is a player character, and
in the vibration control, the vibrator is caused to vibrate according to a relative positional relationship between a location in the virtual space and the player character,
the operation device includes a first operation device and a second operation device,
the first operation device includes a first vibrator configured to vibrate at a specified frequency, the second operation device includes a second vibrator configured to vibrate at a specified frequency, when the first vibrator vibrates at the first frequency, a first portion of the first operation device vibrates more strongly than the other portion of the first operation device, due to resonance, and when the first vibrator vibrates at the second frequency, a second portion of the first operation device closer to the first vibrator than the first portion is vibrates more strongly than the other portion of the first operation device, when the second vibrator vibrates at the first frequency, a first portion of the second operation device vibrates more strongly than the other portion of the second operation device, due to resonance, and when the second vibrator vibrates at the second frequency, a second portion of the second operation device closer to the second vibrator than the first portion is vibrates more strongly than the other portion of the second operation device, and in the vibration control, the first vibrator is caused to vibrate at the first frequency or the second frequency, and the second vibrator is caused to vibrate at the first frequency or the second frequency, according to the positional relationship.

23. An information processing apparatus, comprising:
at least one processor and a memory coupled thereto, the at least one processor being configured to at least:
control an operation device including a vibrator configured to vibrate at specified frequencies;
control a location of an operation object within a range, based on an operation performed on the operation device; and
control a vibration of the vibrator
wherein when the at least one processor controls the vibrator to vibrate at a first frequency, a first portion on a first side of the operation device is caused to vibrate more strongly than a second portion on a second side of the operation device,
wherein when the at least one processor controls the vibrator to vibrate at a second frequency different from the first frequency, the second portion of the operation device different from the first portion is caused to vibrate more strongly than the first portion of the operation device, the first and second sides being different from one another, and
wherein based on information processing executable in connection with the information processing apparatus, the at least one processor is further configured to cause the vibrator to vibrate at (a) the first frequency when the operation object is located at a first location, (b) the second frequency when the operation object is located at a second location remote from the first location, and (c) a third frequency between the first and second frequencies corresponding to a position of the operation object intermediate the first and second locations.

24. The information processing apparatus according to claim 23, wherein:
the range is a virtual space,
the operation object is a player character, and
the at least one processor is further configured to cause the vibrator to vibrate according to a relative positional relationship between a location in the virtual space and the player character.

25. An information processing apparatus, comprising:
at least one processor and a memory coupled thereto, the at least one processor being configured to at least:
control an operation device including a vibrator configured to vibrate at a specified frequency such that when the vibrator vibrates at a first frequency, a first portion of the operation device vibrates more strongly than the other portion of the operation device, and when the vibrator vibrates at a second frequency different from the first frequency, a second portion of the operation device different from the first portion vibrates more strongly than the other portion of the operation device;
control a location of an operation object within a range, based on an operation performed on the operation device; and
cause the vibrator to vibrate at the first frequency or the second frequency, based on an information process, wherein:
when the operation object is located at a first location, the at least one processor causes the vibrator to vibrate at the first frequency, and when the operation object is located at a second location, the at least one processor causes the vibrator to vibrate at the second frequency,
the range is a range of a list within which selection is allowed,
the operation object indicates a currently selected item in the list, and
the at least one processor is further configured to cause the vibrator to vibrate according to a location in the list of the currently selected item indicated by the operation object.

26. An information processing method for use in an information processing system including at least one processor and a memory coupled thereto for controlling an operation device including a vibrator configured to vibrate at specified frequencies, the method comprising:
controlling a location of an operation object within a range, based on an operation performed on the operation device; and
controlling a vibration of the vibrator such that when the vibrator vibrates at a first frequency, a first portion on a first side of the operation device vibrates more strongly than a second portion on a second side of the operation device, and when the vibrator vibrates at a second frequency different from the first frequency, the second portion of the operation device different from the first portion vibrates more strongly than the first portion of the operation device, the first and second sides being different from one another, and
based on information processing performed in connection with the information processing system, in the vibration control, the vibrator is caused to vibrate at (a) the first frequency when the operation object is located at a first location, (b) the second frequency when the operation object is located at a second location remote from the first location, and (c) a third frequency between the first and second frequencies corresponding to a position of the operation object intermediate the first and second locations.

27. An information processing method for use in an information processing system including at least one processor and a memory coupled thereto for controlling an operation device including a vibrator configured to vibrate at a specified frequency, the method comprising:
controlling a location of an operation object within a range, based on an operation performed on the operation device; and controlling a vibration of the vibrator, wherein:
when the vibrator vibrates at a first frequency, a first portion of the operation device vibrates more strongly than the other portion of the operation device, and when the vibrator vibrates at a second frequency different from the first frequency, a second portion of the operation device different from the first portion vibrates more strongly than the other portion of the operation device,
in the vibration control, the vibrator is caused to vibrate at the first frequency or the second frequency, based on an information process,
in the location control, when the operation object is located at a first location, the vibration controller causes the vibrator to vibrate at the first frequency, and when the operation object is located at a second location, the vibration controller causes the vibrator to vibrate at the second frequency,
the range is a range of a list within which selection is allowed,
the operation object indicates a currently selected item in the list, and
in the vibration control, the vibrator is caused to vibrate according to a location in the list of the currently selected item indicated by the operation object.

* * * * *